US012560454B2

(12) United States Patent
Viala et al.

(10) Patent No.: US 12,560,454 B2
(45) Date of Patent: Feb. 24, 2026

(54) METHOD AND SYSTEM FOR MAINTAINING ACCURACY OF A PHOTOGRAMMETRY SYSTEM

(71) Applicant: CREAFORM INC., Lévis (CA)

(72) Inventors: Marc Viala, Varces-Allières-et Risset (FR); Eric St-Pierre, Lévis (CA); Laurentiu Trifan, Grenoble (FR)

(73) Assignee: Creaform Inc., Québec (CA)

( * ) Notice: Subject to any disclaimer, the term of this patent is extended or adjusted under 35 U.S.C. 154(b) by 279 days.

(21) Appl. No.: 17/913,380

(22) PCT Filed: Mar. 26, 2021

(86) PCT No.: PCT/IB2021/052530
§ 371 (c)(1),
(2) Date: Sep. 21, 2022

(87) PCT Pub. No.: WO2021/191861
PCT Pub. Date: Sep. 30, 2021

(65) Prior Publication Data
US 2023/0296408 A1     Sep. 21, 2023

Related U.S. Application Data

(60) Provisional application No. 63/000,395, filed on Mar. 26, 2020.

(51) Int. Cl.
*G01C 25/00*          (2006.01)
*G01C 11/02*          (2006.01)
(Continued)

(52) U.S. Cl.
CPC ............. *G01C 25/00* (2013.01); *G01C 11/02* (2013.01); *G01K 3/10* (2013.01); *G01V 7/00* (2013.01);
(Continued)

(58) Field of Classification Search
CPC .......... G01C 25/00; G01C 11/02; G01K 3/10; G01V 7/00; G06T 7/80;
(Continued)

(56) References Cited

U.S. PATENT DOCUMENTS 5,930,740 A * 7/1999 Mathisen ............. H04N 23/695
                                                            348/E5.022
5,988,862 A * 11/1999 Kacyra ................ G01C 15/002
                                                            702/155
(Continued)

FOREIGN PATENT DOCUMENTS

CN          1894557 A     1/2007

OTHER PUBLICATIONS

International Search Report for Application No. PCT/IB2021/052530, dated Jun. 16, 2021.
(Continued)

*Primary Examiner* — Mohammad K Islam
(74) *Attorney, Agent, or Firm* — PEARL COHEN ZEDEK LATZER BARATZ LLP

(57)          ABSTRACT

A method and a system are disclosed for maintaining accuracy of a photogrammetry system comprising a stereo pair of cameras and characterized by calibration parameters determined at initialization, the system for tracking one of a touch probe and a 3D sensor, the method comprising in use, continuously detecting a presence of a reduced number of 3D target points comprising at least one pair of 3D target points selected in a group comprising at least two 3D target points; measuring image position data associated with the at least one pair of 3D target points of the reduced number of 3D target points; computing at least one updated calibration parameter using the measured image position data and corresponding reference distance data associated with the at least one pair of 3D target points of the reduced number of
(Continued)

3D target points; and updating at least one calibration parameter of the photogrammetry system.

27 Claims, 12 Drawing Sheets

(51) Int. Cl.
|  |  |
|---|---|
| *G01K 3/10* | (2006.01) |
| *G01V 7/00* | (2006.01) |
| *G06T 7/80* | (2017.01) |

(52) U.S. Cl.
CPC ...... *G06T 7/80* (2017.01); *G06T 2207/10012* (2013.01); *G06T 2207/30244* (2013.01)

(58) Field of Classification Search
CPC . G06T 2207/10012; G06T 2207/30244; G06T 2207/30204; G06T 7/85
See application file for complete search history.

(56) References Cited

U.S. PATENT DOCUMENTS

| | | | | |
|---|---|---|---|---|
| 7,075,634 | B2 * | 7/2006 | Uezono | G01C 15/00 |
| | | | | 356/139.1 |
| 7,218,384 | B2 * | 5/2007 | Shirai | G01C 1/04 |
| | | | | 356/3.01 |
| 7,982,866 | B2 * | 7/2011 | Vogel | G01C 25/00 |
| | | | | 356/141.5 |
| 8,928,736 | B2 * | 1/2015 | Nakajima | G06T 17/20 |
| | | | | 348/46 |
| 9,393,694 | B2 * | 7/2016 | Wallack | B25J 9/1692 |
| 9,536,322 | B1 * | 1/2017 | Smith | G06T 7/11 |
| 9,674,504 | B1 | 6/2017 | Salvagnini et al. | |
| 10,602,126 | B2 | 3/2020 | Rowell et al. | |
| 2002/0167726 | A1 * | 11/2002 | Barman | H04N 13/239 |
| | | | | 348/E13.016 |
| 2010/0135534 | A1 * | 6/2010 | Weston | G06T 7/593 |
| | | | | 382/106 |
| 2013/0301909 | A1 * | 11/2013 | Sato | G01B 11/25 |
| | | | | 382/154 |
| 2015/0124059 | A1 * | 5/2015 | Georgiev | H04N 13/246 |
| | | | | 348/47 |
| 2015/0237329 | A1 | 8/2015 | Venkataraman et al. | |
| 2016/0353083 | A1 * | 12/2016 | Aoki | G06T 7/521 |
| 2017/0054965 | A1 * | 2/2017 | Raab | G01B 11/25 |
| 2017/0244960 | A1 | 8/2017 | Ciurea et al. | |
| 2017/0287166 | A1 | 10/2017 | Claveau et al. | |
| 2018/0329516 | A1 | 11/2018 | Steedly et al. | |
| 2019/0379879 | A1 | 12/2019 | Zabatani et al. | |
| 2019/0385330 | A1 * | 12/2019 | Bachhuber | G06T 5/80 |

OTHER PUBLICATIONS

J.L. Crowley, et al., Maintaining Stereo Calibration By Tracking Image Points, Computer Vision And Pattern Recognition, 1993, 1993 IEEE Computer Society Conference in New York, NY, USA, Jun. 15-17, 1993, Los Alamitos, CA, USA, IEEE Comput. Soc, Jun. 15, 1993, pp. 483-488, XP010095950.

Jan Heikkilä, "Update calibration of a photogrammetric station", Close-Range Photogrammetry Meets Machine Vision, Proc. SPIE 1395, 13954E, Aug. 1, 1990, p. 158, XP093103586.

Neil Thacker, et al., Online Stereo Camera Calibration, Sep. 6, 2005, XP055397668, https://www.academia.edu/10058721/Online_Stereo_Camera_Calibration.

Adamczyk, Marcin et al., Temperature Compensation Method for Digital Cameras in 2D and 3D Measurement Applications, Sensors 2018, vol. 18, Institute of Micromechanics and Photonics, Faculty of Mechatronics, Warsaw University of Technology, pp. 3685, Oct. 30, 2018.

Kruth, J.P. et al., Thermal Error Analysis and Compensation of an LED-CMOS Camera 3D Measuring System, Measurement Science Review, vol. 3, Section 3, pp. 5-8. 2003.

Holger Handel, Analyzing the Influences of Camera Warm-Up Effects on Image Acquisition, Institute for Computational Medicine (ICM), Univ. of Mannheim, ACCV 2007, Part II, LNCS 4844, pp. 258-268, 2007.

Podbreznik, Peter et al., Analytical Camera Model Supplemented with Influence of Temperature Variations, World Academy of Science, Engineering and Technology, vol. 17, pp. 62-67, May 24, 2008.

Smith M. J., et al., The Effects Of Temperature Variation On Single-Lens-Reflex Digital Camera Calibration Parameters, International Archives of Photogrammetry, Remote Sensing and Spatial Information Sciences, vol. XXXVIII, Part 5, Commission V Symposium, Newcastle upon Tyne, UK, 2010, pp. 554-559.

Video: Introduction to MetraSCAN and HandyProbe (0:00 min-29:40 min); Published on Dec. 29, 2019; https://www.youtube.com/watch?v=N2D4chartCk.

Video: Complete Inspection Workflow with VXinspect (0:25 min-1:41 min); Published on Jan. 30, 2019; https://www.youtube.com/watch?v=L-M0iHcytVw.

Video: Easy-To-Use Probing Device Using Smart Control Functionality (see 0:12 min to 0:29 min); Published on Nov. 29, 2017; https://www.youtube.com/watch?v=kHHhL4tfM_0&list=PLoorgOquaX84XZKDIQ92zyMaFtsrddtKv&index=4.

Video: Introduction to MetraSCAN and HandyProbe (see 12:20 min to 21:30 min); Published on Dec. 29, 2017; https://www.youtube.com/watch?v=N2D4chartCk.

* cited by examiner

300

METHOD AND SYSTEM FOR MAINTAINING ACCURACY OF A PHOTOGRAMMETRY SYSTEM

CROSS-REFERENCE TO RELATED APPLICATIONS

This application is a National Phase Application of PCT International Application No. PCT/IB2021/052530, International Filing Date Mar. 26, 2021, which claims priority of US Provisional Patent Application No. 63/000,395, filed on Mar. 26, 2020, which are hereby incorporated by reference.

TECHNICAL FIELD

One or more embodiments of the present invention relate to the fields of photogrammetry and metrology, and more particularly to a method and a system for maintaining accuracy of a photogrammetry system.

BACKGROUND

Currently, transportable measuring systems are used for accurately measuring 3D points on objects. One type of those systems is composed of two cameras that are rigidly fixed with respect to the other, namely a camera stereo pair. The stereo pair is used to track either a mobile touch probe or a 3D scanner before collecting 3D points in a single coordinate system. Typically, from the measured 3D points, an inspection analysis of geometry features on the object, can be performed to guarantee conformity with respect to specifications. Another application of those measuring systems is reverse engineering of a mechanical part. In all cases, accuracy is mandatory. For instance, over a working volume of 16 m³, the maximum absolute deviation will be lower than 80 microns.

Photogrammetry is a mature domain and accurate calibration procedures have been developed for the stereo pair of cameras. Moreover, since the photogrammetry systems are transportable, they are used in environments where the temperature may vary and is not controlled as in a laboratory. The photogrammetry systems must be robust to temperature variations while built of relatively low-cost and light materials such as aluminum. For that purpose, sophisticated calibration compensation models have been developed and implemented in several commercially available photogrammetry systems. They make it possible to partially compensate calibration in presence of temperature changes when the stereo pair is equipped with temperature sensors and, in some cases, they can compensate for system deformation due to gravity when the photogrammetry system is equipped with gravity sensors such as an inertial measuring unit (IMU). The compensation is performed when configuring the photogrammetry system at startup.

Unfortunately, such prior art methods suffer from many drawbacks. A first drawback is that environmental conditions are not stable and the prior art model-based compensations may not be sufficient for dealing with changing environmental conditions. Another drawback is that the accuracy may also decrease over time.

Model-based compensations may not be enough especially when environmental conditions are not relatively stable. Accuracy must be improved while keeping cost low and system lightweight.

There is a need for at least one of a method and a system for overcoming at least one of the above-identified drawbacks.

BRIEF SUMMARY

According to a broad aspect there is disclosed a method for maintaining accuracy of a photogrammetry system comprising a stereo pair of cameras mounted on a fixed axis and characterized by calibration parameters determined at initialization, the system for tracking one of a touch probe and a 3D sensor, the method comprising, in use, continuously detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter.

In accordance with one or more embodiments, the at least one pair of 3D target points is affixed on a rigid structure different than an object to measure with the photogrammetry system.

In accordance with one or more embodiments, the rigid structure comprises a scale bar.

In accordance with one or more embodiments, the at least one pair of 3D target points is located on an object to be measured.

In accordance with one or more embodiments, each 3D target point of the reduced number of 3D target points is located on one of a scale bar, an object to measure and a rigid structure different than the object to measure.

In accordance with one or more embodiments, the method further comprises detecting a secondary pair of 3D target points within the working volume; upon detection that at least one 3D target point of the group comprising at least two 3D target points is not visible within the working volume, using the detected secondary pair of 3D target points to update the at least one calibration parameter of the photogrammetry system.

In accordance with one or more embodiments, prior to the detecting of the reduced number of 3D target points located within a working volume of the photogrammetry system, the method comprises measuring a temperature using a temperature sensor, detecting a difference between the measured temperature and a previously measured temperature; and amending at least one calibration parameter of the photogrammetry system accordingly.

In accordance with one or more embodiments, prior to the detecting of the reduced number of 3D target points located within a working volume of the photogrammetry system, the method comprises measuring an orientation of the photogrammetry system with respect to a gravity vector using a gravity sensor, detecting a difference between the measured orientation of the photogrammetry system with respect to a gravity vector and a previously measured orientation and amending at least one calibration parameter of the photogrammetry system accordingly.

In accordance with one or more embodiments, the gravity sensor comprises an inertial measuring unit (IMU).

In accordance with one or more embodiments, the amending of the at least one calibration parameter comprises accessing a temperature-related model describing an effect of temperature on a variation of the at least one calibration parameter.

In accordance with one or more embodiments, the temperature-related model is one of a look-up table, a parametric model and a trained machine-learning model.

In accordance with one or more embodiments, the amending of the at least one calibration parameter comprises accessing a gravity-related model describing an effect of an orientation of the photogrammetry system with respect to a gravity vector on a variation of the at least one calibration parameter.

In accordance with one or more embodiments, the gravity-related model is one of a look-up table, a parametric model and a trained machine-learning model.

In accordance with one or more embodiments, the computing of the at least one amended calibration parameter using the measured image position data and corresponding reference distance data comprises for each given camera of at least two cameras of the photogrammetry system: minimizing an epipolar distance, and a difference between a measured distance from the two observed 3D target points defining a distance, and an actual reference distance for these observed 3D target points.

In accordance with one or more embodiments, the computing of the at least one amended calibration parameter using the measured position data and corresponding reference distance data comprises minimizing, for each given camera of the photogrammetry system:

$$C(p) = \sum_{i=1}^{N} (d_{1_i}^2 + d_{2_i}^2 + \lambda \epsilon_{l_i}^2)$$

Wherein $d_{1_i}^2$ is a squared epipolar distance between a projected first 3D target point in an image of a second camera, given a projection of the first 3D target point in an image of the given camera, and an epipolar line; further wherein $d_{2_i}^2$ is a squared epipolar distance computed for another corresponding observed 3D target point located at a given distance from the first observed 3D target point and wherein $\epsilon_{l_i}^2$ is a squared difference between a measured distance from the two observed 3D target points defining a distance, and an actual reference distance for these observed 3D target points and further wherein $\lambda$ is a scaling parameter.

In accordance with one or more embodiments, the minimizing is performed using a non-linear optimization algorithm.

In accordance with one or more embodiments, the processing steps are performed repetitively at a given frequency.

In accordance with one or more embodiments, the given frequency is a frame rate of the photogrammetry system.

In accordance with one or more embodiments, the frame rate of the photogrammetry system is at least 60 Hz.

In accordance with one or more embodiments, the updating of the at least one calibration parameter of the photogrammetry system is performed using a plurality of computed at least one updated calibration parameters obtained over a given time window.

In accordance with one or more embodiments, the method further comprises determining that the reduced number of 3D target points is not visible within the working volume; measuring at least one of a temperature and a gravity vector; comparing each of the measured at least one of a temperature and a gravity vector with a previous corresponding value; and generating an alert if a change of a given value is detected in at least one of the temperature and a relative gravity vector orientation defined as an orientation of the photogrammetry system with respect to the gravity vector.

In accordance with one or more embodiments, the detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; the measuring image position data associated with the at least one pair of 3D target points of the reduced number of 3D target points using the photogrammetry system; the computing at least one updated calibration parameter using the measured image position data and corresponding reference distance data; and the updating at least one calibration parameter of the photogrammetry system using the computed at least one updated calibration parameter are performed upon a detection of a motion of the photogrammetry system.

In accordance with one or more embodiments, the processing steps of detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter are performed for each given stereo pair of cameras of a system comprising a plurality of stereo pairs of cameras, each given pair of stereo pairs of cameras mounted on a fixed axis and characterized by calibration parameters determined at initialization.

In accordance with a broad aspect, there is disclosed a system for maintaining an accuracy of a photogrammetry system comprising a stereo pair of cameras mounted on a fixed axis and characterized by calibration parameters determined at initialization, the photogrammetry system for tracking one of a touch probe and a 3D sensor, the system comprising a memory for storing data; and a processor operatively connected to each camera of the stereo pair of cameras and to the memory and adapted for implementing the method as disclosed above.

In accordance with a broad aspect, there is disclosed a method for maintaining an accuracy of a photogrammetry system comprising at least three cameras mounted on a fixed axis and characterized by calibration parameters determined at initialization, the system for tracking one of a touch probe and a 3D sensor, the method comprising in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter.

According to a broad aspect, there is disclosed a method for measuring an object using a photogrammetry system, the method comprising providing a photogrammetry system comprising a stereo pair of cameras mounted on a fixed axis and characterized by calibration parameters determined at initialization, the system for tracking one of a touch probe and a 3D sensor; in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter upon detection of a given event, measuring the object using the photogrammetry system with the at least one calibration parameter updated.

In accordance with one or more embodiments, the measuring of the data associated with the at least one pair of 3D target points is performed using a corresponding pair of frames acquired by the stereo pair of cameras, further wherein the measuring of the object using the photogrammetry system is performed using the corresponding pair of frames acquired by the stereo pair of cameras.

In accordance with a broad aspect, there is disclosed a method for maintaining accuracy of a photogrammetry system comprising a stereo pair of cameras mounted on a fixed axis and characterized by calibration parameters determined at initialization, the system for tracking one of a touch probe and a 3D sensor, the method comprising in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data associated with the at least one pair of 3D target points of the reduced number of 3D target points, wherein the corresponding actual reference distance data is known; and updating at least one calibration parameter of the photogrammetry system using the computed at least one updated calibration parameter.

In accordance with a broad aspect, there is disclosed a method for maintaining an accuracy of a photogrammetry system comprising at least three cameras mounted on a fixed axis and characterized by calibration parameters determined at initialization, the system for tracking one of a touch probe and a 3D sensor, the method comprising: in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data associated with the at least one pair of 3D target points of the reduced number of 3D target points, wherein the corresponding actual reference distance data is known; and updating at least one calibration parameter of the photogrammetry system using the computed at least one updated calibration parameter.

In accordance with a broad aspect, there is disclosed a method for measuring an object using a photogrammetry system, the method comprising providing a photogrammetry system comprising a stereo pair of cameras mounted on a fixed axis and characterized by calibration parameters determined at initialization, the system for tracking one of a touch probe and a 3D sensor; in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data associated with the at least one pair of 3D target points of the reduced number of 3D target points, wherein the corresponding actual reference distance data is known; and updating at least one calibration parameter of the photogrammetry system using the computed at least one updated calibration parameter; upon detection of a given event, measuring the object using the photogrammetry system with the at least one calibration parameter updated.

One or more embodiments of the methods disclosed are of great advantages for various reasons.

A first reason is that they enable to maintain an accuracy of a photogrammetry system.

A second reason is that they make it possible to perform high quality measurements for metrology in various non-controlled environments, thus making them more flexible.

DETAILED DESCRIPTION

One or more embodiments of the present invention will be described in detail hereinafter with reference to the drawings and specific embodiments.

Figure 1:
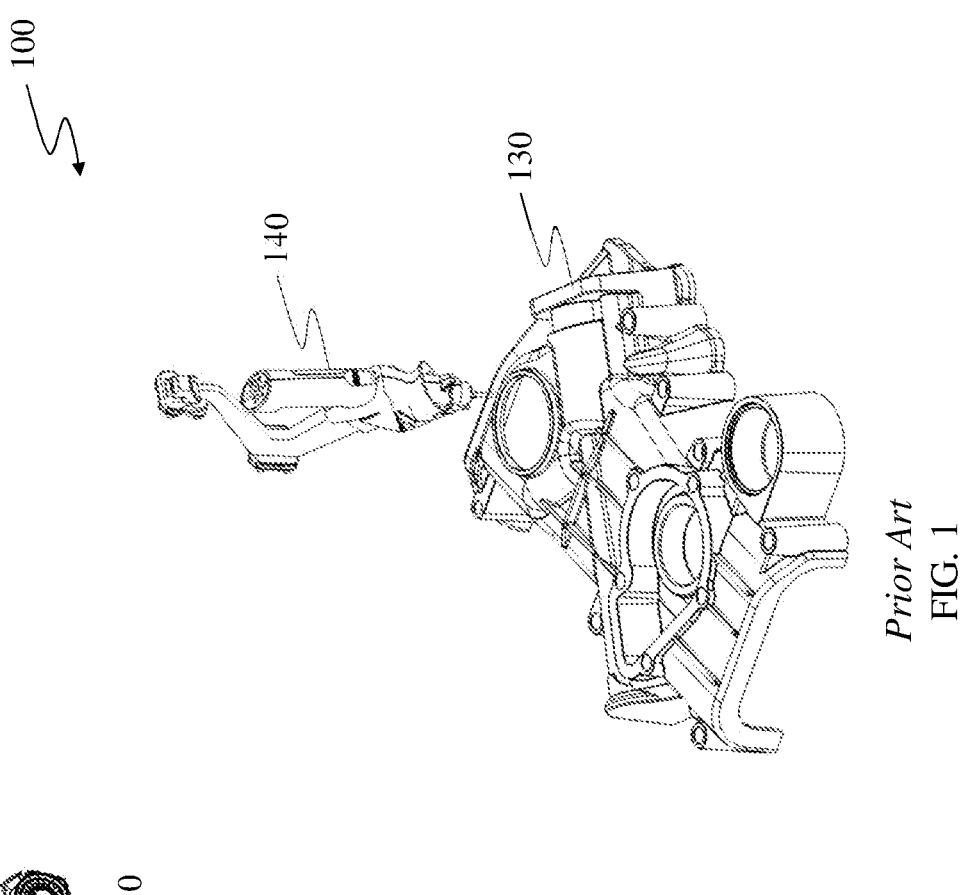
FIG. 1 is a schematic diagram of a prior art measuring system with an optionally built-in model-based compensation.
Figure 1:
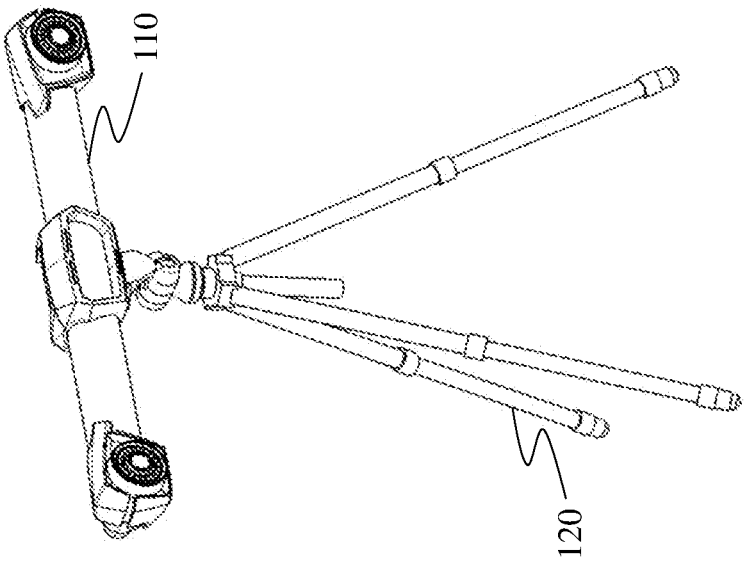

FIG. 1 illustrates an example of a prior art photogrammetry system 100 used for measuring an object 130. The photogrammetry system 100 is comprised of a stereo pair of cameras 110 that are mounted on a fixed basis, depicted in this case as a tripod 120. The object 130 is a mechanical part to be measured. Still referring to FIG. 1, it will be appreciated that there is also illustrated a mechanical touch probe 140 that is tracked by the photogrammetry system 100.

From the observations of 3D target points affixed to the touch probe, in the stereo pair of cameras 110 and based on a set of geometric calibration parameters, the position of the tip of the probe can be calculated by triangulation in order to obtain a 3D point at the surface of the object 130. Several 3D points can then be measured in a common coordinate system. It will be appreciated by the skilled addressee that the accuracy of the 3D points measured depends on the accuracy of the calibration parameters at the time the measurements are made.

Figure 2A:
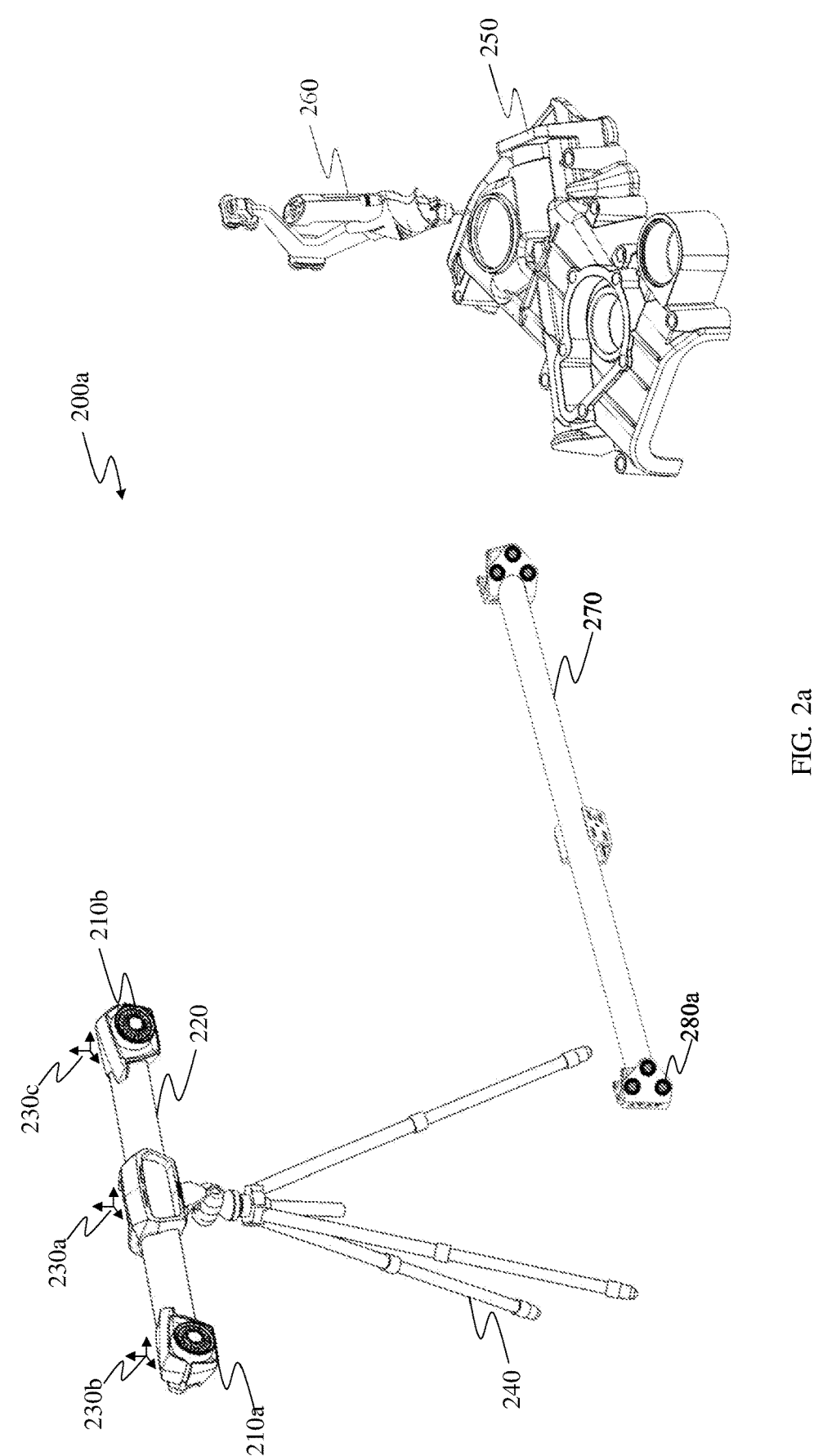
FIG. 2a is a schematic diagram of an embodiment of a photogrammetry system wherein an embodiment of a method for maintaining an accuracy is implemented; in this embodiment the artefact comprises a scale bar.

Now referring to FIG. 2a, there is shown a first embodiment of a photogrammetry system 200a comprising a stereo pair of cameras 210a and 210b, that are mounted at the extremities of a beam 220. It will be appreciated that in this embodiment of the photogrammetry system 200a a method is used for maintaining the accuracy of the photogrammetry system 200a as further explained below.

In one or more embodiments, the beam 220 is made of aluminum and its length is 880 mm for a photogrammetry system 200a operating at a distance between 1.5 m to 4 m of an object 250 to be measured using a tracked touch probe 260. The skilled addressee will appreciate that various alternative embodiments may be provided for the photogrammetry system 200a. It will be further appreciated by the skilled addressee that each camera of the stereo pair of cameras 210a and 210b has its own local coordinate system 230b and 230c, respectively. The assembly comprising the stereo pair of cameras 210a and 210b and the beam 220 is mounted on a basis 240. It will be appreciated that in one or more embodiments, the resolution of each camera of the stereo pair of cameras 210a and 210b is 4 megapixels with 12 mm focal length lenses. The skilled addressee will appreciate that various alternative embodiments may be possible.

It will be appreciated that the photogrammetry system 200a is characterized by calibration parameters determined at initialization. It will be appreciated that the method for maintaining accuracy comprises in use, continuously detecting a presence of a reduced number of 3D target points compared to a corresponding number of 3D target points required for calibrating the photogrammetry system, the reduced number of 3D target points comprising at least one pair of 3D target points selected in a group comprising at least two 3D target points. The skilled addressee will appreciate that typically tens and even hundreds of 3D target points are used to accurately calibrate a photogrammetry system. It will be appreciated that in one or more other embodiments, the at least one pair of 3D target points is selected in a group comprising more than three 3D target points. The method further comprises measuring image position data, i.e. the position of a target point in the image, associated with the at least one pair of 3D target points using the photogrammetry system 200a. The method for maintaining accuracy further comprises computing at least one updated calibration parameter using the measured image position data and corresponding reference distance data. The method for maintaining accuracy further comprises updating at least one calibration parameter of the photogrammetry system 200a using the computed at least one updated calibration parameter.

Still referring to FIG. 2a, it will be appreciated that optional temperature sensors are also provided and fixed to the beam 220 and on or close to the stereo pair of cameras 210a and 210b. The optional temperature sensors measure the temperature of the components of the photogrammetry system 200a along with an ambient temperature. The optional temperature sensors are used for detecting temperature changes as well as for evaluating a compensation to be applied to at least one calibration parameter. In fact, it will be appreciated that in one or more embodiments, the photogrammetry system 200a can be compensated according to the temperature conditions in the environment. Accordingly, in one or more embodiments, the method for maintaining accuracy further comprises, prior to the detecting of the reduced number of 3D target points located within a working volume of the photogrammetry system, measuring a temperature using the optional temperature sensor, detecting a difference between the measured temperature and a previously measured temperature and amending at least one calibration parameter of the photogrammetry system accordingly.

The photogrammetry system 200a is also equipped with an optional gravity sensor, an example of which is a 6 degrees of freedom inertial measuring unit (IMU) that is used for measuring the orientation of the gravity vector, aiming at the center of Earth, with respect to the coordinate system of the stereo pair of cameras 210a and 210b. The optional gravity sensor is used, inter alia, for detecting inclination changes as well as for evaluating an amendment to be applied to at least one calibration parameter, as further explained below. In fact, it will be appreciated that at least one calibration parameter of the photogrammetry system 200a may be compensated according to a variation of a relative gravity vector orientation defined as an orientation of the photogrammetry system 200a with respect to a gravity vector. The skilled addressee will appreciate that the 6 degrees of freedom inertial measuring unit (IMU) can be of various types. In one or more embodiments, the 6 degrees of freedom inertial measuring unit (IMU) is the LSM6DS3US and is manufactured by STMicroelectronics™. Accordingly, in one or more embodiments, the method for maintaining accuracy further comprises, prior to the detecting of the reduced number of 3D target points located within a working volume of the photogrammetry system, measuring an orientation of the photogrammetry system with respect to a gravity vector using a gravity sensor, detecting a difference between the measured orientation of the photogrammetry system with respect to a gravity vector and a previously measured orientation and amending at least one calibration parameter of the photogrammetry system accordingly. As mentioned above and in accordance with one or more embodiments, the gravity sensor comprises an inertial measuring unit (IMU).

In fact, it will be appreciated that the typical model for the projection of a 3D point given in a world coordinate system, into a given camera is given by the following equation of the perspective transformation:

$$sm=A[R|t]M$$

This equation can be expanded as:

$$s\begin{bmatrix} u \\ v \\ 1 \end{bmatrix} = \begin{bmatrix} f_x & \gamma & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

where (X,Y,Z) are the coordinates of a 3D point in a world coordinate system, (u, v) are the coordinates of the projected points in an image, $(c_x,c_y)$ are the coordinates of the principal point in the image, $(f_x,f_y)$ are the focal lengths along the two axes of the camera sensor, and y is a shearing factor. The first matrix on the right-hand side is named the camera matrix and encodes the intrinsic parameters. The second matrix on the right-hand side encompasses the extrinsic parameters where the first 3×3 subterms $r_{ij}$ encode a rotation matrix that is orthogonal and that can be parameterized by three independent parameters. It encodes the relative orientation of the world coordinate system with respect to the camera coordinate system. Finally, the last column of this latter matrix is a translation vector that encodes the position of the origin of the world coordinate system in the camera. The projection model is generally enhanced with distortion parameters, typically 2 to 4 radial and 2 decentering parameters, to better model the projection of a 3D point in a real camera and lens arrangement. Other distortion parameters are also known in the art. These distortion parameters are commonly considered as intrinsic parameters.

Given a stereo pair of cameras, one may write the same projection equation for the second camera of the stereo pair of cameras. This second camera has its own intrinsic parameters and extrinsic parameters with respect to the world coordinate system. Nevertheless, when the stereo pair of cameras is considered a rigid assembly, the second camera will preferably be expressed in a coordinate system that is relative to the first camera. In this case, the equation remains the same except that the extrinsic matrix then represents the transformation between the first and the second cameras for a 3D point expressed in the coordinate system of the first camera. It is equivalent to setting the world coordinate system of the second camera to the coordinate system of the first camera.

For a given 3D point, the model makes it possible to calculate its projection in both cameras. Conversely, given two image points of the same 3D point, one in each of the camera images, one can recover the position of the 3D point by triangulation as the intersection of two lines in 3D. The line equations are easily obtained from the preceding matrices. This knowledge is part of the prior art. The accuracy of a measured 3D point closely depends on the intrinsic parameters of the two cameras, as well as on the extrinsic relationship between both cameras.

It will be appreciated that those calibration parameters are initially calibrated at factory and typically recalibrated, at least for a subset of the calibration parameters, before use on site. Nevertheless, it has been contemplated that since the stereo system is transportable to various environments or can be submitted to variable changing conditions, it is of great advantage to update the calibration parameters or at least, a subset of at least one calibration parameter, in order to use such systems in demanding metrology applications where the accuracy will typically be better than a few tens of microns (e.g. absolute maximum deviation of 80 microns) over a working volume of 16 m³, at a distance of 4 m. It will be appreciated that at that level of accuracy, perturbations induced by temperature changes or system orientation with respect to the gravity vector will affect at least one of the calibrated parameters (extrinsic and intrinsic) and must be compensated since the photogrammetry system deforms.

It will be appreciated that as mentioned above, a presence of at least one pair of 3D target points selected in a group comprising at least two 3D target points located within a working volume of the photogrammetry system 200a is detected.

In the embodiment disclosed in FIG. 2a, a scale bar 270, such as one depicted in FIG. 2a, is used with the photogrammetry system 200a. While the scale bar 270 is typically used for performing a recalibration on site before usage as known to the skilled addressee; it has been contemplated that the scale bar 270 can be further used while the photogrammetry system 200a is being used, i.e. between measurements on the object.

In fact and for recalibration purposes before use and according to prior art methods, the scale bar 270 is typically moved at several positions and orientations within the working volume. Afterwards, it is removed from the scene. This recalibration procedure takes minutes to be accomplished and is performed once after setting up and warming up the system.

In accordance with one or more embodiments of the method disclosed herein, the scale bar 270 is now left within the working volume while the photogrammetry system 200a is being used in order to perform the method for maintaining accuracy.

The scale bar 270 integrates at least one pair of 3D target points, an embodiment of which is targets 280a, whose positions can be accurately measured in the camera images.

In order to avoid the necessity of recalibrating when the environmental conditions change in temperature, a temperature-related model describing an effect of temperature on a variation of at least one calibration parameter may be used. Accordingly, in one or more embodiments of the method disclosed herein, the amending of the at least one calibration parameter comprises accessing a temperature-related model describing an effect of temperature on a variation of the at least one calibration parameter. In one or more embodiments, the temperature-related model comprises a Look-up Table generated after submitting the photogrammetry system 200a to various temperature conditions at factory. In one or more other embodiments, the temperature-related model comprises a parametric model. For instance, one possibility would be to fit a function, such as a polynomial function, to each of the extrinsic and intrinsic parameters after calibrating the photogrammetry system 200a at various temperatures of usage. In one or more other embodiments, the temperature-related model comprises a trained machine-learning model. It will be appreciated that the trained machine-learning model may include deep-learning schemes used to model a relationship between the environmental parameter, namely the temperature, and the camera model calibration parameters. This temperature-related model may then be used to adapt at least one of the calibration parameters as temperature conditions change. It will be appreciated that the temperature may affect all calibration parameters but typically, the baseline distance between the two cameras will vary according to the coefficient of thermal expansion of the material linking the two cameras. Similarly, the optomechanical arrangement of the lenses, as well as the printed circuit boards on which the sensing circuits are mounted on, will deform with temperature. At some point for metrology, it is not negligible anymore, and one cannot consider the intrinsic parameters stable.

Figure 3:
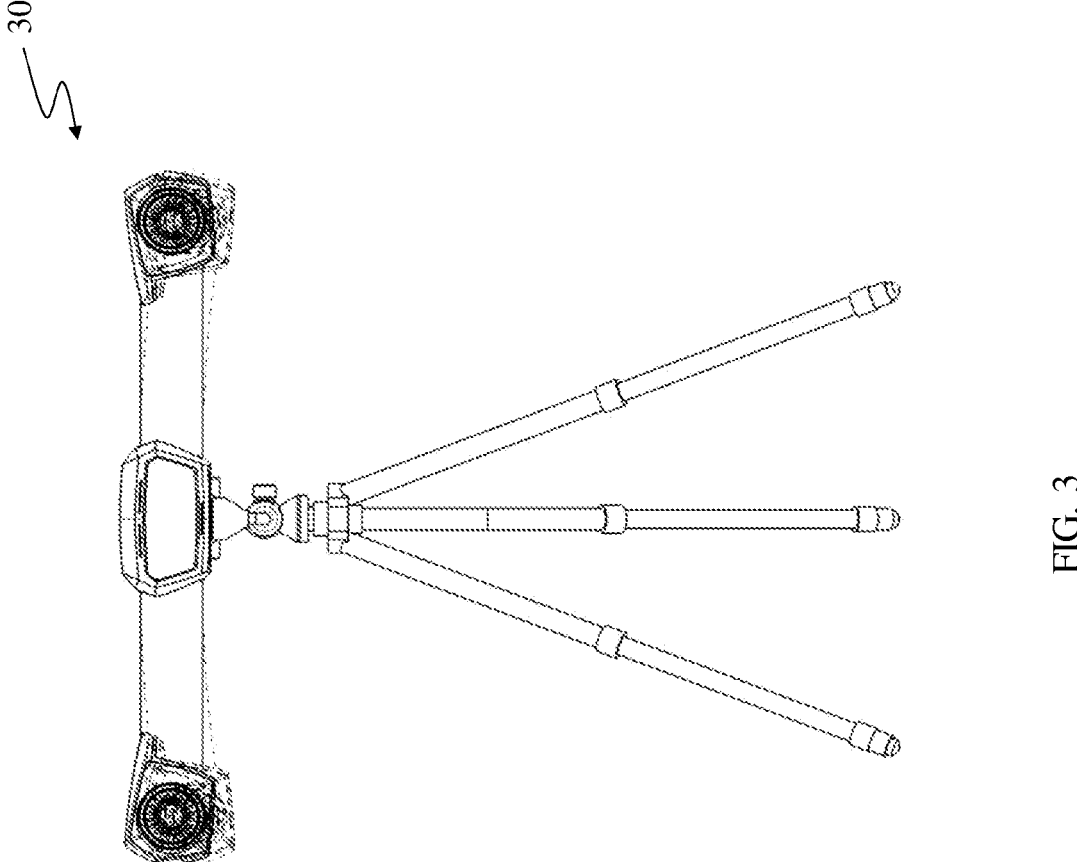
FIG. 3 is a schematic diagram of an embodiment of a photogrammetry system deformed under the effect of gravity.

It will also be appreciated that the orientation of the stereo pair of cameras 201a and 210b with respect to the gravity vector will affect the camera calibration parameters when considering the whole arrangement as deformable. This is shown in FIG. 3 at 300 where the deformation is exaggerated for illustrative purposes. At factory, the photogrammetry system is calibrated for several orientations and as described above for temperature, a gravity-related model may be used. It will be appreciated that the gravity-related model describes an effect of an orientation of the photogrammetry system with respect to a gravity vector on a variation of the at least one calibration parameter. It will be therefore appreciated that in one or more embodiments of the method disclosed herein, the amending of the at least one calibration parameter comprises accessing a gravity-related model describing an effect of an orientation of the photogrammetry system with respect to a gravity vector on a variation of the at least one calibration parameter. In one or more embodiments, the gravity-related model comprises a Look-up Table. In one or more other embodiments, the gravity-related model comprises a parametric model. In such embodiments, the gravity-related model can be fit for each parameter, as a function of the orientation of the stereo system with respect to the gravity vector. Although all parameters of the perspective transformation might be affected, typically, the three angles describing the relative orientation of the second camera with respect to the first camera will be more affected. In one or more other embodiments, the gravity-related model comprises a trained machine-learning model. It will be appreciated that in one or more embodiments, the trained machine-learning model comprises deep-learning schemes for modelling a relationship between an effect of an orientation of the photogrammetry system with respect to a gravity vector on a variation of at least one calibration parameter.

It will be appreciated that at least one of the gravity-related model and the temperature-related model may be applied in any order.

It will be appreciated that those compensations maintain the accuracy of the photogrammetry system while submitted to environmental changes. The calibration parameters stay close to their ideal values, but discrepancies may remain. They can still be improved to reduce measurement errors using one or more embodiments of the method disclosed herein. For that purpose and in accordance with one or more other embodiments, the scale bar used as a reference artefact is left visible within the working volume.

Figure 4:
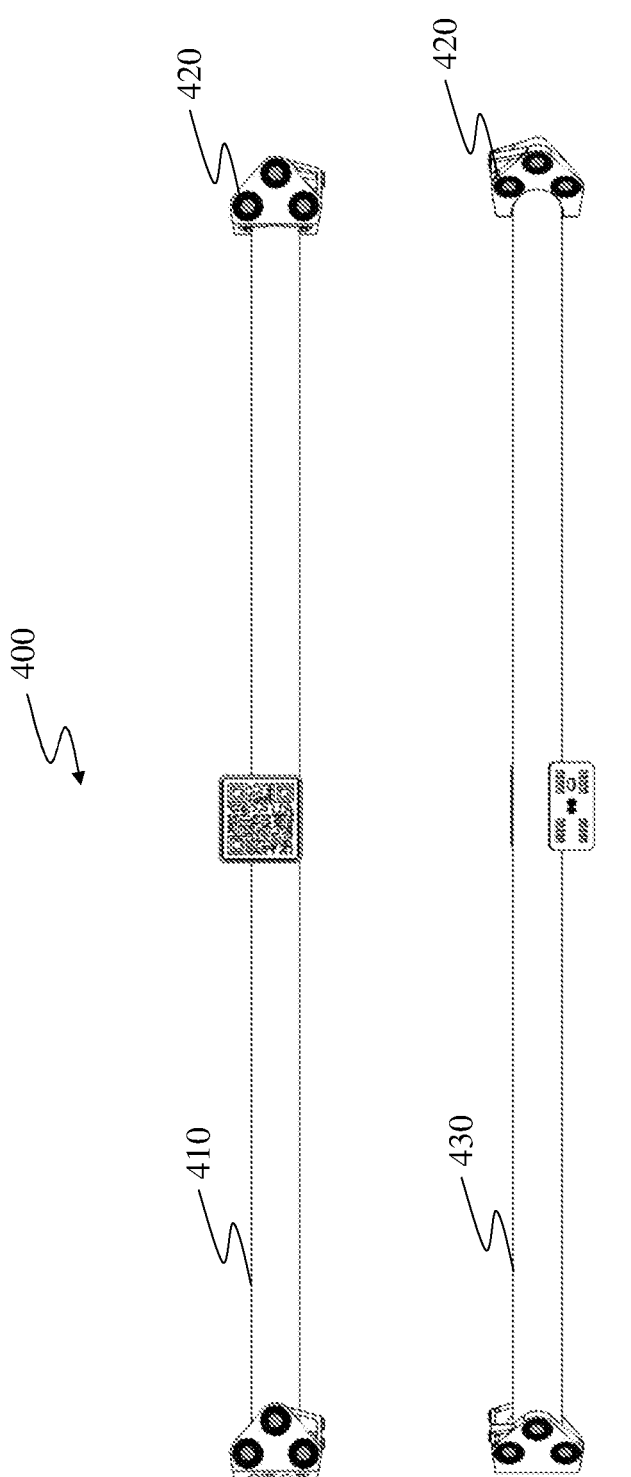
FIG. 4 is a schematic diagram of back and front views of an embodiment of a prior art scale bar.

Now referring to FIG. 4, it will be appreciated that the exemplified prior art scale bar 410 on one side integrates triplets of 3D target points 420 at its extremities. It will also be appreciated that additional 3D target points are also affixed on the opposite side 430 of the scale bar, and at different angles, for more flexibility according to visibility. It will be appreciated that each triplet of 3D target points can be observed simultaneously with their corresponding 3D target points at the opposite of the scale bar. Two corresponding 3D target points constitute a pair of 3D target points selected in a group comprising at least two 3D target points. One can thus define three recognizable, and thus observable, lengths. These observed reference lengths are further integrated into a nonlinear optimization to adjust the camera projection parameters (intrinsic and extrinsic) represented as the vector p in the following criterion that is minimized:

$$C(p) = \sum_{i=1}^{N} \left( d_{1_i}^2 + d_{2_i}^2 + \lambda \epsilon_{l_i}^2 \right)$$

Figure 5:
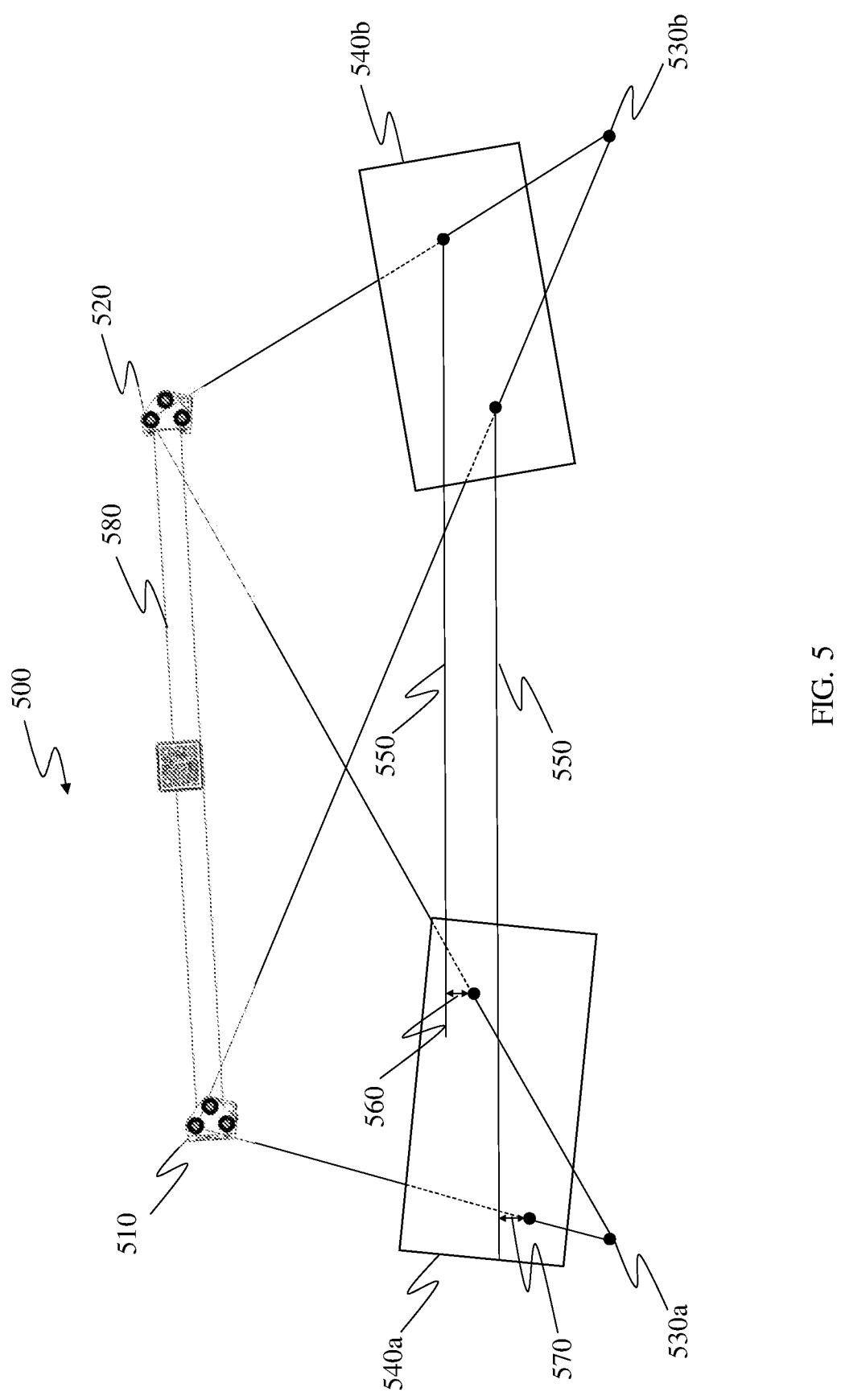
FIG. 5 is a schematic diagram of projections and epipolar distances in a photogrammetry system comprising a stereo pair of cameras.

The first term $d_{1_i}^2$ is the squared epipolar distance 570 illustrated in FIG. 5 between a projected 3D target point 510 in the image 540a of the second camera 530a, given the projection of the same 3D target point in the image 540b of the first camera 530b and the epipolar line 550. The second term $d_{2_i}^2$ is the same error for the corresponding 3D target point 520 at the opposite of the scale bar 580, defining a measurable length. Without restriction, these two squared distances can be measured in mm, in the camera normalized plane (of unit focal length). Finally, the last term $\epsilon_{l_i}^2$ is the squared difference between the measured length from the two observed 3D target points defining a length, and the actual reference scale bar length for these 3D target points. It is also possible to scale the length differences with $\lambda$ when it is deemed that their sizes differ too much from the epipolar distances. Typically, those differences will remain within the same range. When the first two terms are calculated in pixels, $\lambda$ can be set to the relative scale with respect to the last term. As a variant, both terms $d_{1_i}^2$ and $d_{2_i}^2$ can be each calculated as the sum of the squared distances between a projected 3D target point in the image of the second camera, given the projection of the same 3D target point in the first camera and the squared distances between the same projected 3D target point in the image of the first camera, given the projection of the same 3D target point in the second camera and the epipolar line in the first camera. Again, a subset of the two camera parameters can be selected for optimization. It will be appreciated that in one or more embodiments, the optimization is performed using a non-linear algorithm, such as the Levenberg-Marquardt algorithm. The skilled addressee will appreciate that another nonlinear optimization algorithm may be used in one or more alternative embodiments.

It will be appreciated that in one or more embodiments, the computing of the at least one amended calibration parameter using the measured image position data and corresponding reference distance data comprises for each given camera of the photogrammetry system minimizing an epipolar distance, and a difference between a measured distance from the two observed 3D target points defining a distance, and an actual reference distance for these observed 3D target points.

Figure 2B:
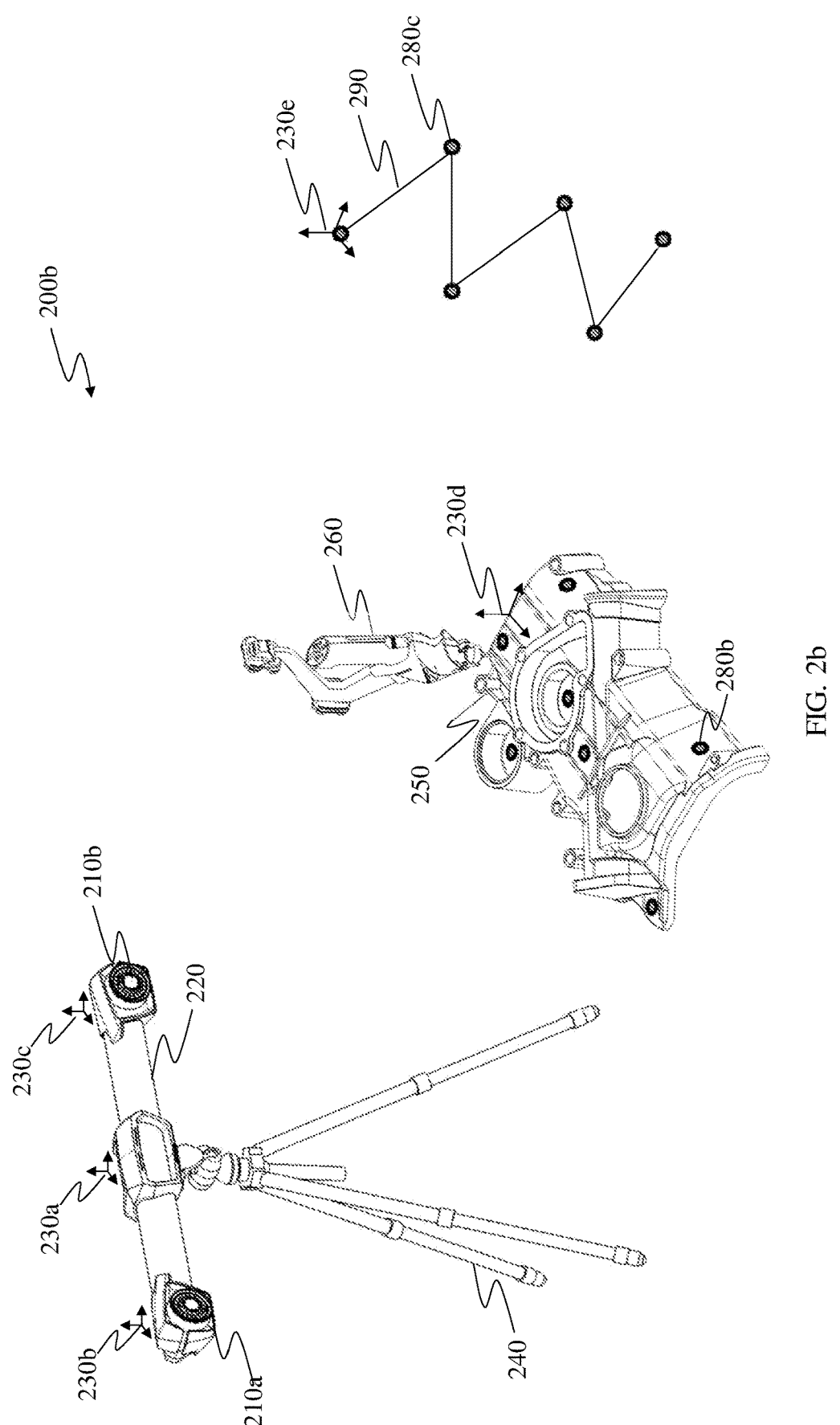
FIG. 2b is a schematic diagram of an embodiment of a photogrammetry system wherein an embodiment of a method for maintaining accuracy is implemented; in this embodiment, at least one pair of 3D target points is affixed on an object and on an additional rigid structure.
Figure 2C:
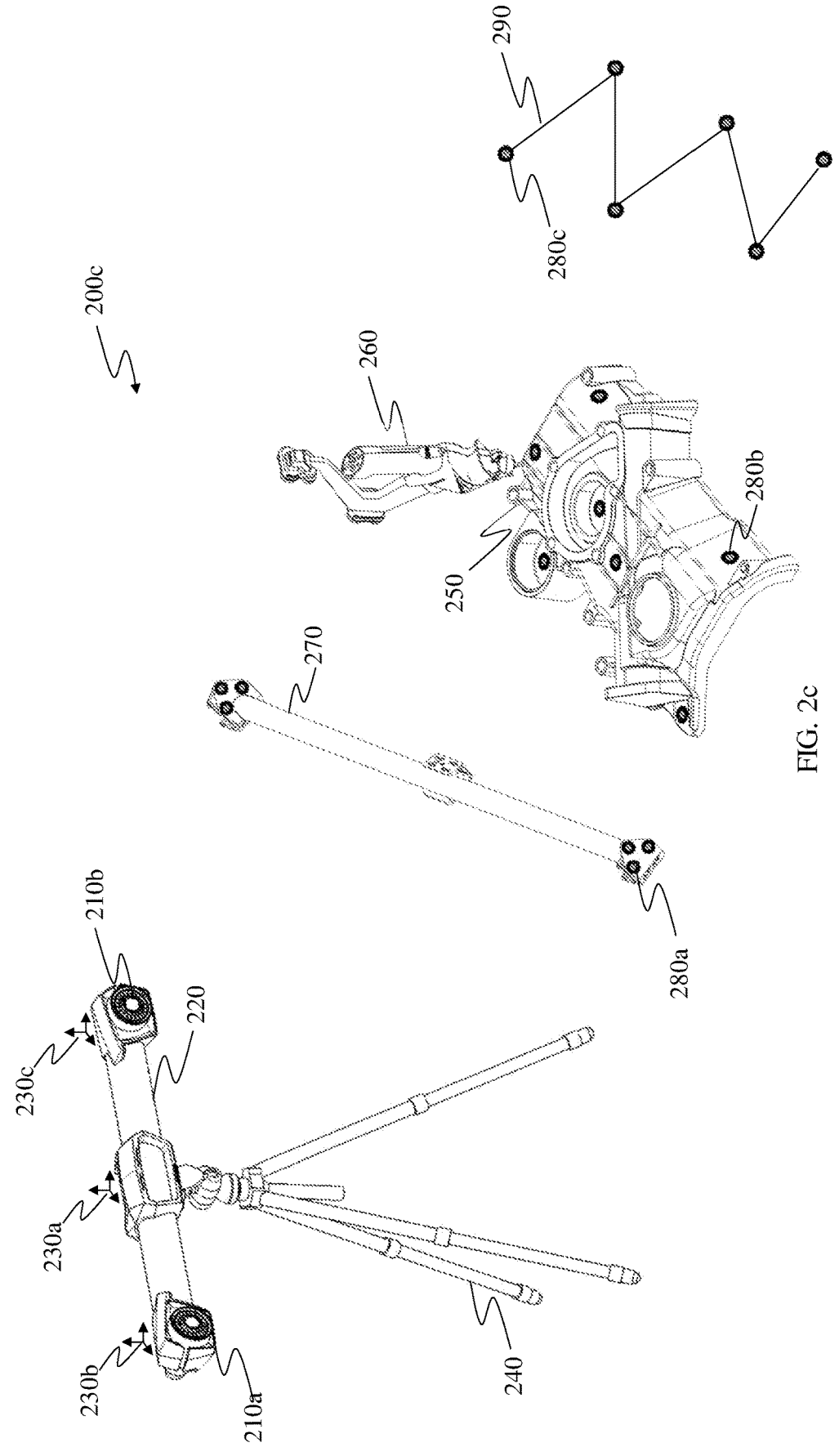
FIG. 2c is a schematic diagram of an embodiment of a photogrammetry system wherein an embodiment of a method for maintaining accuracy is implemented; in this embodiment the artefact comprises a scale bar and a plurality of 3D target points are also affixed on an object and an additional rigid structure.

Now referring to FIG. 2b, there is shown another embodiment of a photogrammetry system 200b wherein 3D target points are affixed on the object 250 to measure and wherein a model of those 3D target points 280b is built beforehand.

In one or more other embodiments, it will be appreciated that the at least one pair of 3D target points 280c are affixed on a rigid structure different than the object to measure 250 as shown in FIG. 2b. It will be appreciated that in these embodiments, the artefact comprises at least one pair of 3D target points which are preferably affixed on a rigid stable structure 290. It will be appreciated by the skilled addressee that increasing the number of 3D target points and distributing them within the working volume will lead to more pairs of 3D target points and thus to better conditions for improving the accuracy of the photogrammetry system. Moreover, when 3D target points are affixed on both the environment as well as on the object 250 to measure, it is possible to track motion disturbance between the object 250 to measure and the environment since two target models are built in their respective coordinate systems 230d and 230e. In the present case, one will select lengths from pairs of 3D target points that remain still within the working volume. It will be appreciated that in the case where the object to be measured and the rigid structure are fixed one with respect to the other, it will be possible to select a pair of 3D target point with one of the 3D target points on the object to measure and the other 3D target point the rigid structure. It will be therefore appreciated that in one or more embodiments, the at least one pair of 3D target points is affixed on a rigid structure different than an object to measure with the photogrammetry system. In one or more embodiments, the rigid structure comprises a scale bar. In one or more embodiments, the at least one pair of 3D target points is located on an object to be measured. In one or more embodiments, each 3D target point of the reduced number of 3D target points is located on one of a scale bar, an object to measure and a rigid structure different than the object to measure.

It will be appreciated that in the embodiments disclosed in FIGS. 2a and 2b, the scale bar can be kept visible within the working volume or not. Nevertheless, when using a target model built with a different photogrammetric system or even with the same stereo system but at a different time, it is important to adapt the scale of the exploited 3D target point model with the scale bar pairs of 3D target points. It will be appreciated that omitting this scaling procedure may induce systematic errors even after compensation.

It will be appreciated that the method for maintaining accuracy of a photogrammetry system may be integrated within a real-time compensation loop where either or both the compensations for temperature and gravity changes are applied. It will be appreciated that this is also referred to as a dynamic environmental compensation. In one or more embodiments, at least one of the calibration parameters may be updated at the frame rate of the photogrammetry system. In one or more embodiments, the frame rate is at least 60 Hz. It will be further appreciated that in one or more embodiments, the updating of the at least one calibration parameter of the photogrammetry system is performed using a plurality of computed at least one updated calibration parameters obtained over a given time window.

Figure 6:
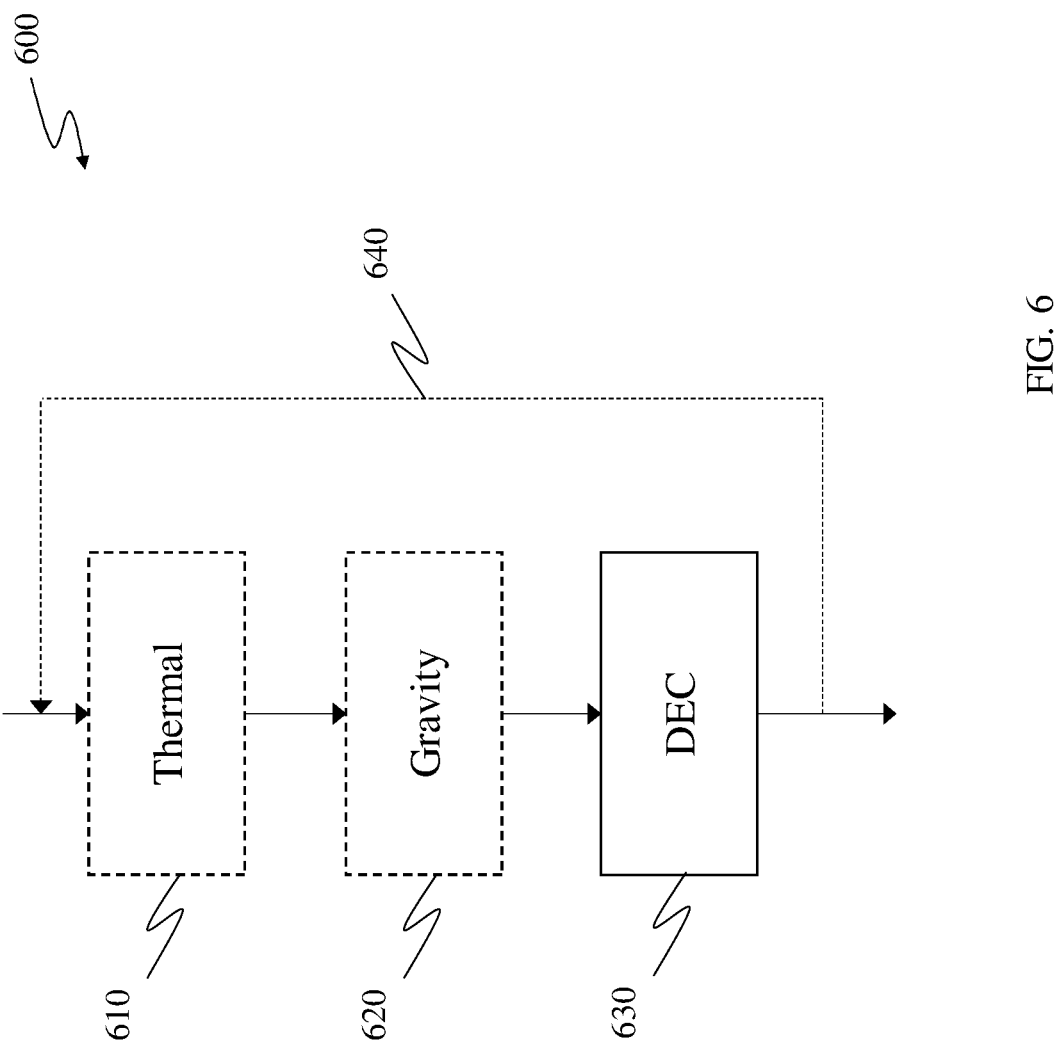
FIG. 6 is a flowchart illustrating an embodiment of a method for maintaining accuracy of a photogrammetry system comprising a stereo pair of cameras.

Now referring to FIG. 6, there is shown an embodiment of a compensation loop 600.

According to processing step 610, an optional temperature-related model compensation is performed.

According to processing step 620, an optional gravity-related model compensation based on gravity sensor measurements is performed.

According to processing step 630, a dynamic environment compensation that implements the optimization described above, after observing scaled pairs of 3D points in the scene is performed.

It will be appreciated that the model-based compensation, either thermal or gravity, is optional and the order to apply them can be inverted. It will also be appreciated by the skilled addressee that other model-based compensations may be applied before the dynamic environment compensation.

It will be appreciated that the method for maintaining accuracy of the photogrammetry system can be performed at least twice, for a determined or for an undetermined number of iterations. In one or more embodiments, the method is performed repetitively at a given frequency. In one or more embodiments, the given frequency is the frame rate of the photogrammetry system. In one or more embodiments, the frame rate is at least 60 Hz.

Since temperature and gravity effects are not instantaneous and may evolve over several seconds, one or more embodiments of the method disclosed herein are performed typically in real-time. Moreover, due to measurement errors and in order to improve robustness of the estimate, the values of the calibration parameters values may be robustly filtered, excluding outliers, over a moving average that is typically of a few seconds. In other words, the updating of the at least one calibration parameter of the photogrammetry system is performed using a plurality of computed at least one updated calibration parameters obtained over a given time window.

Figure 7:
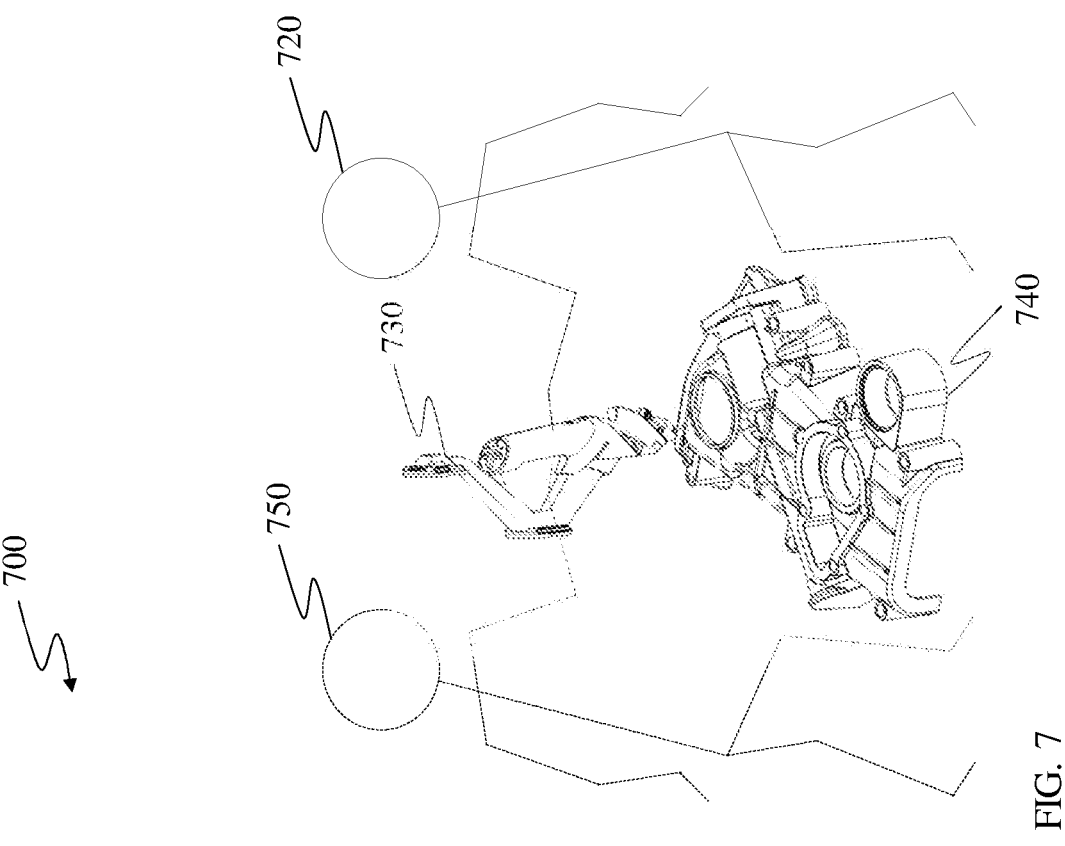
FIG. 7 is a schematic diagram of an embodiment of a photogrammetry system wherein an embodiment of a method for maintaining accuracy is implemented and further wherein the photogrammetry system is under the effect of occlusion.
Figure 7:
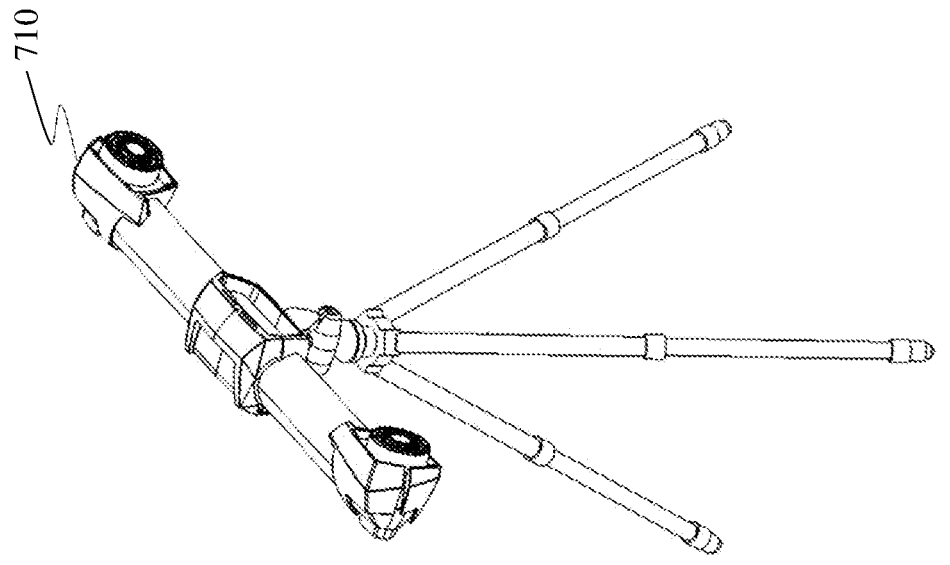

During the measurement process, it is common that the reference artefacts become completely or partially occluded by the user as depicted in FIG. 7. Actually, the user 720 will hold either a mechanical point probe 730 or a 3D scanner in front of the stereo system 710 while moving for point capture around the object 740. In such a situation, when the user 750 occludes the artefacts, the photogrammetry system may only apply model-based compensations for temperature and gravity. The real-time optimisation based on observed pair of 3D target points may then not be applicable. The photogrammetry system will however detect when a significant change of environmental conditions occurs before alerting the user that the real-time compensation is not applied and consequently, that a loss of accuracy may result. It will be appreciated that typical thresholds are 0.5° C. for the temperature and less than a degree for a change in the orientation of the gravity vector.

Figure 8:
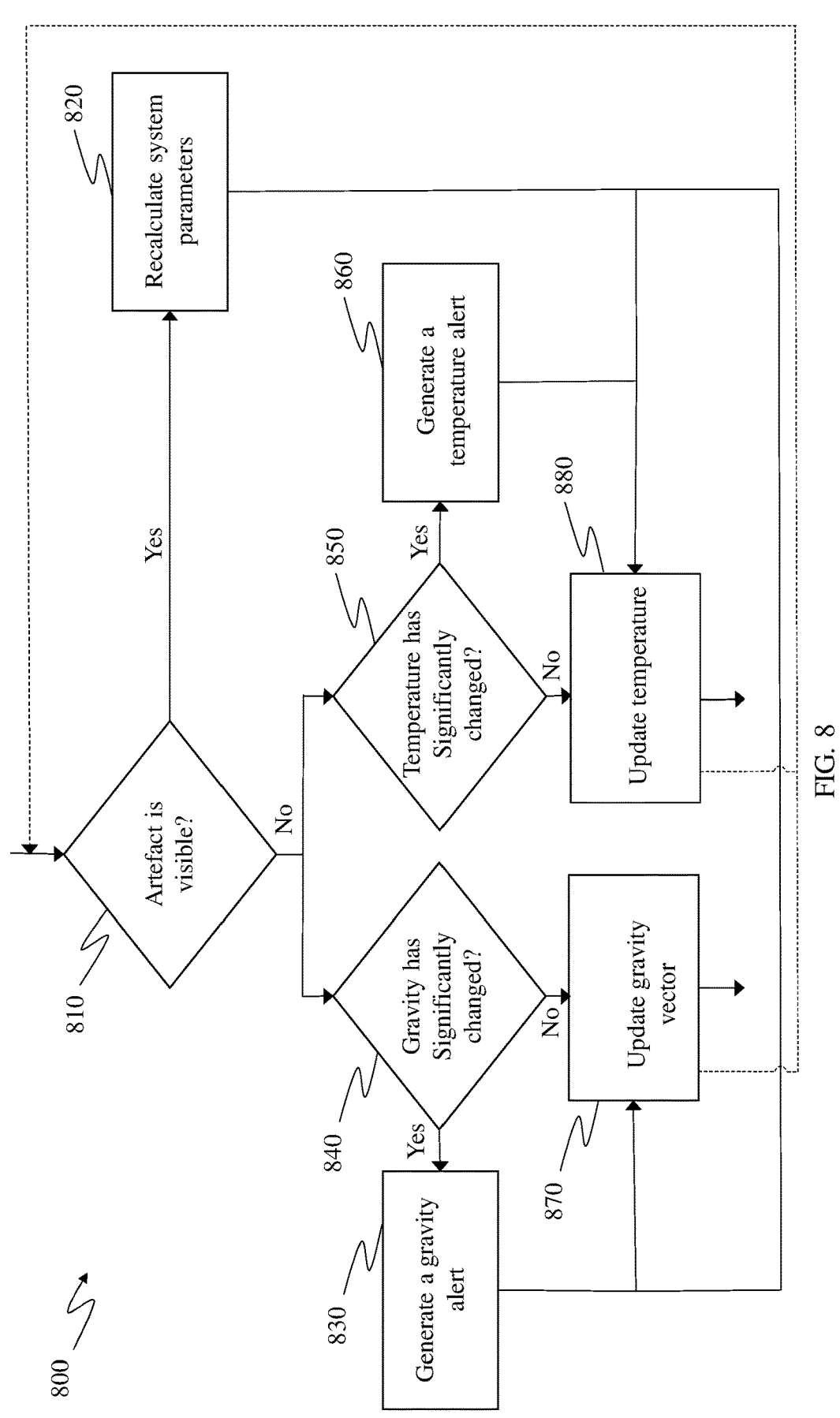
FIG. 8 is a flowchart of an embodiment of a method for maintaining accuracy of a photogrammetry system comprising a stereo pair of cameras.

Now referring to FIG. 8, there is shown a more detailed description of an embodiment of a method for maintaining accuracy of a photogrammetry system.

According to processing step 810, a check is performed in order to find out if an artefact is visible. It will be appreciated that this is an embodiment of checking if a reduced number of 3D target points compared to a corresponding number of 3D target points required for calibrating the photogrammetry system is visible or not within the working volume. The reduced number of 3D target points comprises at least one pair of 3D target points selected in a group comprising at least two 3D target points.

In the case where the artefact is visible and according to processing step 820, at least one calibration parameter of the photogrammetry system may be updated. More precisely, this processing step comprises measuring image position data, i.e. a position of a target point in the image, associated with the at least one pair of 3D target points of the artefact using the photogrammetry system; computing at least one updated calibration parameter using the measured image position data and corresponding reference distance data; and updating at least one calibration parameter of the photogrammetry system using the computed at least one updated calibration parameter.

It will be appreciated that according to processing steps 870 and 880, the temperature and the relative gravity vector orientation are updated.

When at least one artefact is not visible and according to processing step 850, a check is performed by the photogrammetry system to find out if the temperature has significantly changed compared to a previous value.

According to processing step 840, a check is also performed in order to find out if the relative gravity vector orientation has also significantly changed or not. It will be appreciated that the processing steps 840 and 850 may be performed sequentially in time in any order or in parallel. If any of those conditions is verified, the photogrammetry system will generate an alert message. More precisely and according to processing step 830 a gravity alert is generated if the relative gravity vector orientation has significantly changed.

According to processing step 860, a temperature alert is generated if the temperature has significantly changed. Those alerts are indicative of the fact that a loss of accuracy is to be anticipated. It will be appreciated by the skilled addressee that the alerts may be provided according to various embodiments. In one or more embodiments, the alert comprises a sound signal. In one or more other embodiments, the alert comprises a visual indication on a display or an activated light source, such as a LED. It will be appreciated that the system may also be configured to reject measurements in case of occlusions.

It will be appreciated that in normal situations where there is no occlusion and according to respectively processing steps 880 and 870, the measured temperature and the relative gravity vector orientation are updated before optionally repeating a loop iteration.

Figure 9:
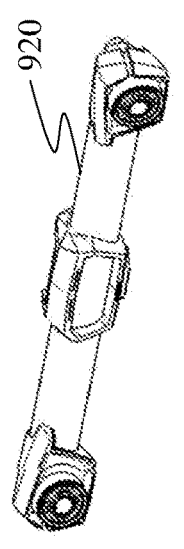
FIG. 9 is a schematic diagram of an embodiment of a system comprising two stereo pairs of cameras.
Figure 9:
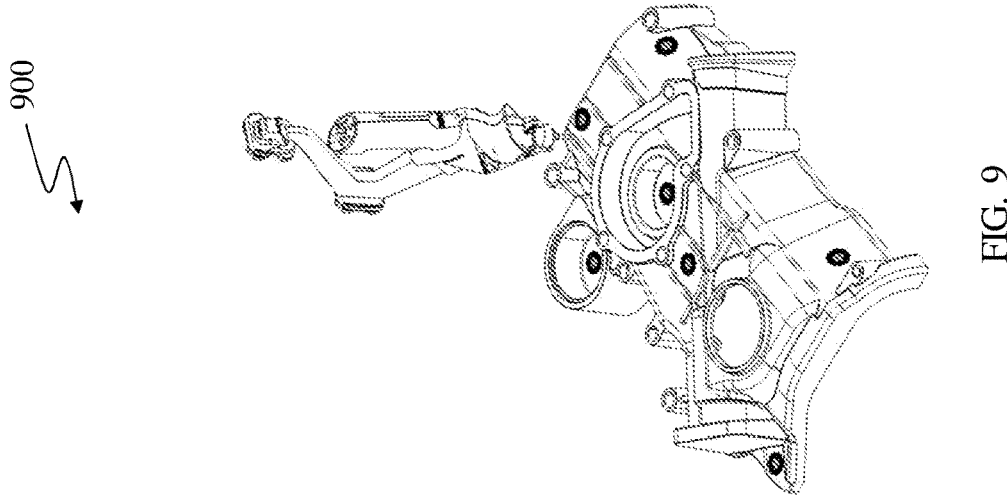
Figure 9:
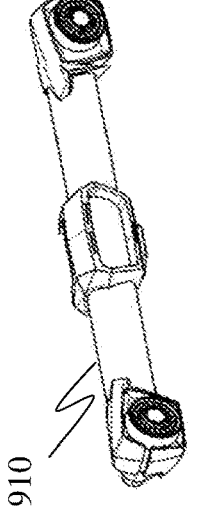

It will be appreciated that a compensation in real-time from scaled 3D models may also be applied advantageously when a stereo system is moved around an object within the scene or when more than one synchronized stereo system observe the same object to extend the working volume, while still ensuring accuracy within the volume. The embodiment with two photogrammetry systems, 910 and 920, is illustrated in FIG. 9.

Accordingly, it will be appreciated that in one or more embodiments of the method disclosed above, the method further comprises determining that the reduced number of 3D target points is not visible within the working volume. The method further comprises measuring at least one of a temperature and a gravity vector. The method further comprises comparing each of the measured at least one of a temperature and a gravity vector with a previous corresponding value and generating an alert if a change of a given value is detected in at least one of the temperature and a relative gravity vector orientation defined as an orientation of the photogrammetry system with respect to the gravity vector. It will be appreciated that in one or more embodiments, the processing steps of detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter are performed upon a detection of a motion of the photogrammetry system.

It will be further appreciated that in one or more embodiments, the processing steps of detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data and updating at least one calibration parameter of the photogrammetry system using the computed at least one updated calibration parameter are performed for each given stereo pair of cameras of a system comprising a plurality of stereo pairs of cameras, each given pair of stereo pairs of cameras mounted on a fixed axis and characterized by calibration parameters determined at initialization.

Figure 10:
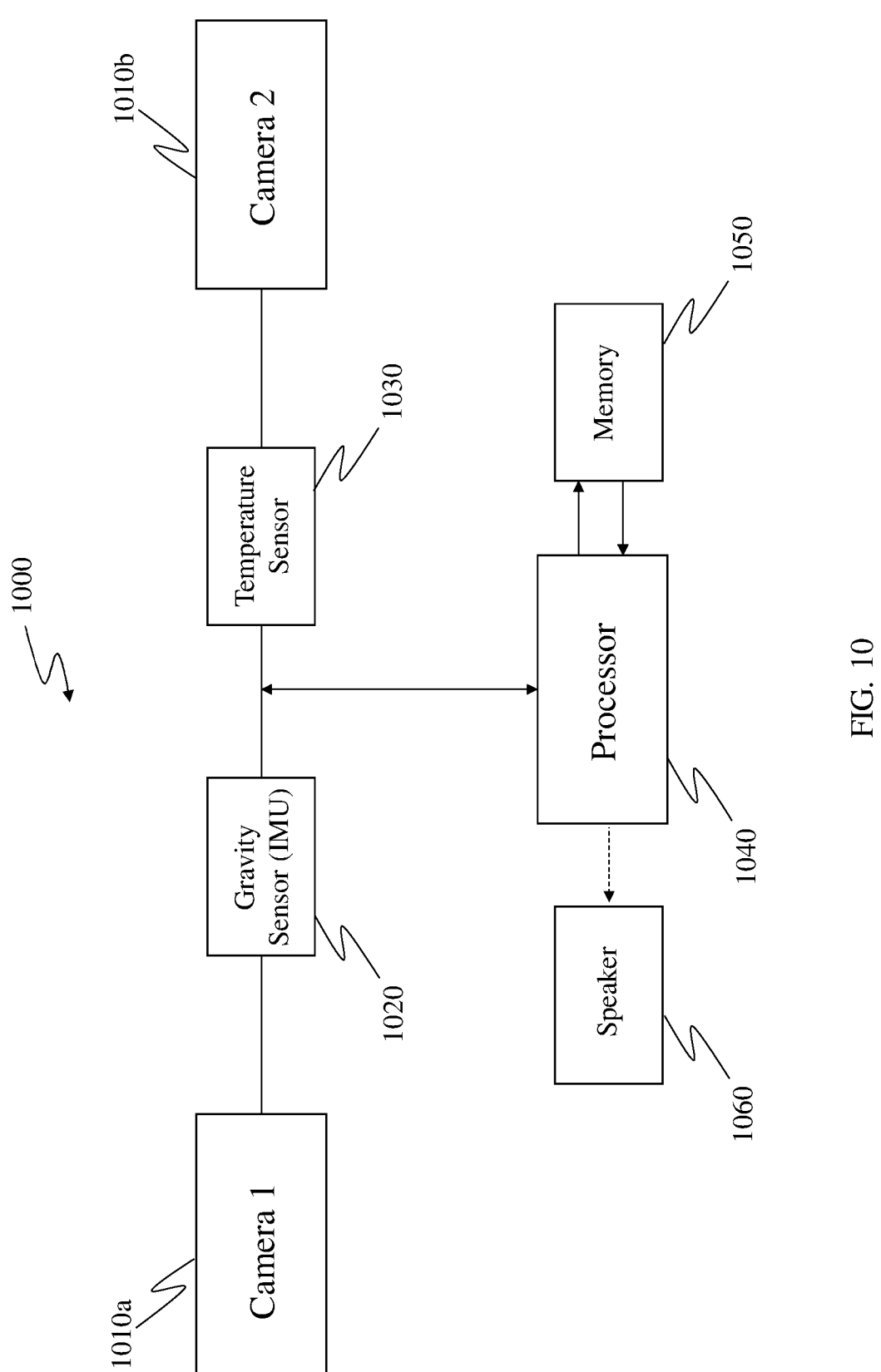
FIG. 10 is a schematic diagram of an embodiment of a system used for implementing a method for maintaining accuracy of a photogrammetry system comprising a stereo pair of cameras.

Now referring to FIG. 10, there is shown a block diagram of a system for implementing one or more embodiments of the method for maintaining accuracy disclosed herein on a photogrammetry system 1000 comprising a stereo pair of cameras 1010a and 1010b.

In this embodiment, the system comprises a temperature sensor 1030 and a gravity sensor 1020 which is an inertial measuring unit (IMU). It will be appreciated that the temperature sensor 1030 is operatively connected to the stereo pair of cameras 1010a and 1010b. Moreover, it will be appreciated that the gravity sensor is operatively connected to the photogrammetry system.

The system further comprises a processor 1040. The processor 1040 is operatively connected to the temperature sensor 1030 and to the gravity sensor 1020.

It will be appreciated that the system further comprises a memory 1050. The memory 1050 is operatively connected to the processor 1040. It will be appreciated that the memory may be of various types. In one or more embodiments, the memory 1050 is a 32 GB SDRAM DDR4 and is manufactured by Corsair™.

It will be appreciated that the processor 1040 and the memory 1050 may be integrated either within a dedicated computer platform or within a commodity computer.

It will be further appreciated that the stereo pair of cameras 1010a and 1010b are synchronized and provide images to the processor 1040 at a frame rate of at least 60 Hz. The gravity sensor 1020 provides a measure of the gravity vector at the same frame rate. Finally, the temperature sensor 1030 further provides an indication of a temperature inside the photogrammetry system as well as an indication of the environment external temperature.

The processor 1040 will typically process images to extract target points and get image position data, match them between the at least two cameras and match pairs of 3D target points from the artefact models. From the memory 1050, it will access the calibration parameters, the model-based related compensation data for temperature and gravity and the artefact models including pairs of 3D target points. The processor 1040 will then update at least one of the calibration parameters, calculate and output measured points on the inspected object.

It will be appreciated that in one or more embodiments, the system further comprises an optional speaker 1060 operatively connected to the processor 1040 for providing an alert as explained above.

It will be appreciated that the in one or more embodiments, the system is integrated within the photogrammetry system.

In accordance with one or more embodiments, there is also disclosed a system for maintaining an accuracy of a photogrammetry system comprising a stereo pair of cameras mounted on a fixed axis and characterized by calibration parameters determined at initialization, the photogrammetry system for tracking one of a touch probe and a 3D sensor, the system comprising a memory for storing data and a processor operatively connected to each camera of the stereo pair of cameras and to the memory and adapted for implementing the method as disclosed above.

It will be also appreciated that there is disclosed a method for measuring an object using a photogrammetry system, the method comprising providing a photogrammetry system comprising a stereo pair of cameras mounted on a fixed axis and characterized by calibration parameters determined at initialization, the system for tracking one of a touch probe and a 3D sensor. The method further comprises, in use, continuously detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data and updating at least one calibration parameter of the photogrammetry system using the computed at least one updated calibration parameter and upon detection of a given event, measuring the object using the photogrammetry system with the at least one calibration parameter updated. In one or more embodiments, the measuring of the data associated with the at least one pair of 3D target points is performed using a corresponding pair of frames acquired by the stereo pair of cameras, further wherein the measuring of the object using the photogrammetry system is performed using the corresponding pair of frames acquired by the stereo pair of cameras.

There is also disclosed a method for maintaining an accuracy of a photogrammetry system comprising at least three cameras mounted on a fixed axis and characterized by calibration parameters determined at initialization, the system for tracking one of a touch probe and a 3D sensor, the method comprising in use, continuously detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter.

One or more embodiments of the methods disclosed are of great advantages for various reasons.

A first reason is that they maintain an accuracy of a photogrammetry system over time.

A second reason is that they make it possible to perform high quality measurements for metrology in various non-controlled environments, thus making them more flexible.

Clause 1. A method for maintaining accuracy of a photogrammetry system comprising a stereo pair of cameras mounted on a fixed axis and characterized by calibration parameters determined at initialization, the system for tracking one of a touch probe and a 3D sensor, the method comprising: in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the artefact in a pair of the reduced number of 3D target points using the photogrammetry system; computing at least one updated calibration parameter using the measured image position data and corresponding reference distance data; and updating at least one calibration parameter of the photogrammetry system using the computed at least one updated calibration parameter.

Clause 2. The method as claimed in clause 1, wherein the at least one pair of 3D target points is affixed on a rigid structure different than an object to measure with the photogrammetry system.

Clause 3. The method as claimed in clause 2, wherein the rigid structure comprises a scale bar.

Clause 4. The method as claimed in clause 1, wherein the at least one pair of 3D target points is located on an object to be measured.

Clause 5. The method as claimed in clause 1, wherein each 3D target point of the reduced number of 3D target points is located on one of a scale bar, an object to measure and a rigid structure different than the object to measure.

Clause 6. The method as claimed in clause 1, further comprising detecting a secondary pair of 3D target points within the working volume; upon detection that at least one 3D target point of the group comprising at least two 3D target points is not visible within the working volume, using the detected secondary pair of 3D target points to update the at least one calibration parameter of the photogrammetry system.

Clause 7. The method as claimed in any one of clauses 1 to 6, further wherein prior to the detecting of the reduced number of 3D target points located within a working volume of the photogrammetry system, the method comprises: measuring a temperature using a temperature sensor, detecting a difference between the measured temperature and a previously measured temperature; and amending at least one calibration parameter of the photogrammetry system accordingly.

Clause 8. The method as claimed in any one of clauses 1 to 7, further wherein prior to the detecting of the reduced number of 3D target points located within a working volume of the photogrammetry system, the method comprises: measuring an orientation of the photogrammetry system with respect to a gravity vector using a gravity sensor, detecting a difference between the measured orientation of the photogrammetry system with respect to a gravity vector and a previously measured orientation; and amending at least one calibration parameter of the photogrammetry system accordingly.

Clause 9. The method as claimed in clause 8, wherein the gravity sensor comprises an inertial measuring unit (IMU).

Clause 10. The method as claimed in clause 7, wherein the amending of the at least one calibration parameter comprises accessing a temperature-related model describing an effect of temperature on a variation of the at least one calibration parameter.

Clause 11. The method as claimed in clause 10, wherein the temperature-related model is one of a look-up table, a parametric model and a trained machine-learning model.

Clause 12. The method as claimed in clause 8, wherein the amending of the at least one calibration parameter comprises accessing a gravity-related model describing an effect of an orientation of the photogrammetry system with respect to a gravity vector on a variation of the at least one calibration parameter.

Clause 13. The method as claimed in clause 12, wherein the gravity-related model is one of a look-up table, a parametric model and a trained machine-learning model.

Clause 14. The method as claimed in any one of clauses 1 to 13, wherein the computing of the at least one amended calibration parameter using the measured image position data and corresponding reference distance data comprises: for each given camera of at least two cameras of the photogrammetry system: minimizing an epipolar distance, and a difference between a measured distance from the two observed 3D target points defining a distance, and an actual reference distance for these observed 3D target points.

Clause 15. The method as claimed in clause 14, wherein the computing of the at least one amended calibration parameter using the measured position data and corresponding reference distance data comprises minimizing, for each given camera of the photogrammetry system:

$$C(p) = \sum_{i=1}^{N}\left(d_{1_i}^2 + d_{2_i}^2 + \lambda\epsilon_{l_i}^2\right)$$

Wherein $d_{1_i}^2$ is a squared epipolar distance between a projected first 3D target point in an image of a second camera, given a projection of the first 3D target point in an image of the given camera and an epipolar line; further wherein $d_{2_i}^2$ is a squared epipolar distance computed for another corresponding observed 3D target point located at a given distance from the first observed 3D target point and wherein $\epsilon_{l_i}^2$ is a squared difference between a measured distance from the two observed 3D target points defining a distance, and an actual reference distance for these observed 3D target points and further wherein A is a scaling parameter.

Clause 16. The method as claimed in clause 15, wherein the minimizing is performed using a non-linear optimization algorithm.

Clause 17. The method as claimed in any one of clauses 1 to 16, wherein the processing steps are performed repetitively at a given frequency.

Clause 18. The method as claimed in clause 17, wherein the given frequency is a frame rate of the photogrammetry system.

Clause 19. The method as claimed in clause 18, wherein the frame rate of the photogrammetry system is at least 60 Hz.

Clause 20. The method as claimed in any one of clauses 17 to 19, wherein the updating of the at least one calibration parameter of the photogrammetry system is performed using a plurality of computed at least one updated calibration parameters obtained over a given time window.

Clause 21. The method as claimed in any one of clauses 1 to 20, further comprising determining that the reduced number of 3D target points is not visible within the working volume; measuring at least one of a temperature and a gravity vector; comparing each of the measured at least one of a temperature and a gravity vector with a previous corresponding value; and generating an alert if a change of a given value is detected in at least one of the temperature and a relative gravity vector orientation defined as an orientation of the photogrammetry system with respect to the gravity vector.

Clause 22. The method as claimed in any one of clauses 1 to 21, further wherein the processing steps of detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter are performed upon a detection of a motion of the photogrammetry system.

Clause 23. The method as claimed in any one of clauses 1 to 22, wherein the processing steps of detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter are performed for each given stereo pair of cameras of a system comprising a plurality of stereo pairs of cameras, each given pair of stereo pairs of cameras mounted on a fixed axis and characterized by calibration parameters determined at initialization.

Clause 24. A system for maintaining an accuracy of a photogrammetry system comprising a stereo pair of cameras mounted on a fixed axis and characterized by calibration parameters determined at initialization, the photogrammetry system for tracking one of a touch probe and a 3D sensor, the system comprising a memory for storing data; and a processor operatively connected to each camera of the stereo pair of cameras and to the memory and adapted for implementing the method as claimed in any one of clauses 1 to 23.

Clause 25. A method for maintaining an accuracy of a photogrammetry system comprising at least three cameras mounted on a fixed axis and characterized by calibration parameters determined at initialization, the system for tracking one of a touch probe and a 3D sensor, the method comprising in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter.

Clause 26. A method for measuring an object using a photogrammetry system, the method comprising providing a photogrammetry system comprising a stereo pair of cameras mounted on a fixed axis and characterized by calibration parameters determined at initialization, the system for tracking one of a touch probe and a 3D sensor; in use, continuously: detecting a presence of a reduced number of 3D target points compared to a corresponding number of 3D target points required for calibrating the photogrammetry system, the reduced number of 3D target points comprising at least one pair of 3D target points selected in a group comprising at least two 3D target points; measuring image position data associated with the at least one pair of 3D target points of the reduced number of 3D target points using the photogrammetry system; computing at least one updated calibration parameter using the measured image position data and corresponding reference distance data; and updating at least one calibration parameter of the photogrammetry system using the computed at least one updated calibration parameter upon detection of a given event, measuring the object using the photogrammetry system with the at least one calibration parameter updated.

Clause 27. The method as claimed in clause 26, wherein the measuring of the data associated with the at least one pair of 3D target points is performed using a corresponding pair of frames acquired by the stereo pair of cameras, further wherein the measuring of the object using the photogrammetry system is performed using the corresponding pair of frames acquired by the stereo pair of cameras.

It will be appreciated that in one or more alternative embodiments, the photogrammetry system comprises at least three cameras. In such case, pairs of cameras may be selected in accordance with one embodiment. Alternatively more than two cameras may be used as it is known to the skilled addressee that the epipolar geometry theory extends to more than two cameras.

Accordingly, it will be appreciated that there is also disclosed a method for improving accuracy of a photogrammetry system comprising at least three cameras mounted on a fixed axis and characterized by calibration parameters determined at initialization, the system for tracking one of a touch probe and a 3D sensor, the method comprising in use: detecting a presence of an artefact located within a working volume of the photogrammetry system, the artefact comprising at least one pair of 3D target points selected in a group comprising at least two 3D target points; measuring position data associated with the at least one pair of 3D target points of the artefact using the photogrammetry system; computing at least one updated calibration parameter using the measured position data and corresponding reference distance data and updating at least one calibration parameter of the photogrammetry system using the computed at least one updated calibration parameter.

The invention claimed is:

1. A computer-implemented method for maintaining accuracy of a photogrammetry system comprising a stereo pair of cameras mounted on a fixed axis, the stereo pair of cameras being characterized by calibration parameters determined at initialization, the system configured for tracking one of a touch probe and a 3D sensor, the method comprising:

in use, continuously performing a compensation loop by:

detecting, using the stereo pair of cameras, a presence of a reduced number of 3D target points compared to a corresponding number of 3D target points required for calibrating the photogrammetry system, the reduced number of 3D target points comprising at least one pair of 3D target points selected in a group comprising at least two 3D target points;

measuring image position data and a measured distance associated with the selected at least one pair of 3D target points of the reduced number of 3D target points using the stereo pair of cameras of the photogrammetry system;

computing at least one updated calibration parameter using the measured image position data and corresponding reference distance data associated with the at least one pair of 3D target points of the reduced number of 3D target points corresponding to the measured distance, wherein a corresponding reference distance data is known, the at least one updated calibration parameter determined based on the measured distance of the reduced number of 3D target points and the reference distance of the reduced number of 3D target points; and updating at least one calibration parameter of at least one camera of the stereo pair of cameras of the photogrammetry system using the computed at least one updated calibration parameter.

2. The method as claimed in claim 1, wherein the at least one pair of 3D target points is affixed on a rigid structure different than an object to measure with the photogrammetry system.

3. The method as claimed in claim 2, wherein the rigid structure comprises a scale bar.

4. The method as claimed in claim 1, wherein the at least one pair of 3D target points is located on an object to be measured.

5. The method as claimed in claim 1, wherein each 3D target point of the reduced number of 3D target points is located on one of a scale bar, an object to measure and a rigid structure different than the object to measure.

6. The method as claimed in claim 1, further comprising: detecting a secondary pair of 3D target points within the working volume; upon detection that at least one 3D target point of the group comprising at least two 3D target points is not visible within the working volume, using the detected secondary pair of 3D target points to update the at least one calibration parameter of the photogrammetry system.

7. The method as claimed in claim 1, further wherein prior to the detecting of the reduced number of 3D target points located within a working volume of the photogrammetry system, the method comprises: measuring a temperature using a temperature sensor, detecting a difference between the measured temperature and a previously measured temperature; and amending at least one calibration parameter of the photogrammetry system accordingly.

8. The method as claimed in claim 1, further wherein prior to the detecting of the reduced number of 3D target points located within a working volume of the photogrammetry system, the method comprises: measuring an orientation of the photogrammetry system with respect to a gravity vector using a gravity sensor, detecting a difference between the measured orientation of the photogrammetry system with respect to a gravity vector and a previously measured orientation; and amending at least one calibration parameter of the photogrammetry system accordingly.

9. The method as claimed in claim 8, wherein the gravity sensor comprises an inertial measuring unit (IMU).

10. The method as claimed in claim 7, wherein the amending of the at least one calibration parameter comprises accessing a temperature-related model describing an effect of temperature on a variation of the at least one calibration parameter.

11. The method as claimed in claim 10, wherein the temperature-related model is one of a look-up table, a parametric model and a trained machine-learning model.

12. The method as claimed in claim 8, wherein the amending of the at least one calibration parameter comprises accessing a gravity-related model describing an effect of an orientation of the photogrammetry system with respect to a gravity vector on a variation of the at least one calibration parameter.

13. The method as claimed in claim 12, wherein the gravity-related model is one of a look-up table, a parametric model and a trained machine-learning model.

14. The method as claimed in claim 1, wherein the computing of the at least one updated calibration parameter using the measured image position data and corresponding reference distance data comprises: for each given camera of the stereo pair of cameras of the photogrammetry system: minimizing:
an epipolar distance for the two selected 3D target points, and
a difference between a measured distance from the two selected 3D target points defining a distance, and the corresponding reference distance for these selected 3D target points.

15. The method as claimed in claim 14, wherein the computing of the at least one updated calibration parameter using the measured position data and corresponding reference distance data comprises minimizing, for each given camera of the photogrammetry system:

$$C(p) = \sum_{i=1}^{N} \left( d_{1_i}^2 + d_{2_i}^2 + \lambda \epsilon_{i_i}^2 \right)$$

wherein $d_{1_i}^2$ is the squared epipolar distance between a projected first 3D target point in an image of a second camera, given a projection of the first 3D target point in an image of the given camera, and an epipolar line; further wherein $d_{2_i}^2$ is the squared epipolar distance computed for another corresponding observed 3D target point located at a given distance from the first observed 3D target point and wherein $\epsilon_{1_i}^2$ is the squared difference between a measured distance from the two observed 3D target points defining a distance, and an actual reference distance for these observed 3D target points and further wherein $\lambda$ is a scaling parameter.

16. The method as claimed in claim 15, wherein the minimizing is performed using a non-linear optimization algorithm.

17. The method as claimed in claim 1, wherein the processing steps are performed repetitively at a given frequency.

18. The method as claimed in claim 17, wherein the given frequency is a frame rate of the photogrammetry system.

19. The method as claimed in claim 18, wherein the frame rate of the photogrammetry system is at least 60 Hz.

20. The method as claimed in claim 17, wherein the updating of the at least one calibration parameter of the photogrammetry system is performed using a plurality of computed at least one updated calibration parameters obtained over a given time window.

21. The method as claimed in claim 1, further comprising:
determining that the reduced number of 3D target points is not visible within the working volume;
measuring at least one of a temperature and a gravity vector;
comparing each of the measured at least one of a temperature and a gravity vector with a previous corresponding value; and
generating an alert if a change of a given value is detected in at least one of the temperature and a relative gravity vector orientation defined as an orientation of the photogrammetry system with respect to the gravity vector.

22. The method as claimed in claim 1, further wherein the processing steps of:
detecting a presence of a reduced number of 3D target points compared to a corresponding number of 3D target points required for calibrating the photogrammetry system, the reduced number of 3D target points comprising at least one pair of 3D target points selected in a group comprising at least two 3D target points;
measuring image position data associated with the at least one pair of 3D target points of the reduced number of 3D target points using the photogrammetry system;
computing at least one updated calibration parameter using the measured image position data and corresponding reference distance data; and
updating at least one calibration parameter of the photogrammetry system using the computed at least one updated calibration parameter
are performed upon a detection of a motion of the photogrammetry system.

23. The method as claimed in claim 1, wherein the processing steps of:
detecting a presence of a reduced number of 3D target points compared to a corresponding number of 3D target points required for calibrating the photogrammetry system, the reduced number of 3D target points comprising at least one pair of 3D target points selected in a group comprising at least two 3D target points;
measuring image position data associated with the at least one pair of 3D target points of the reduced number of 3D target points using the photogrammetry system;
computing at least one updated calibration parameter using the measured image position data and corresponding reference distance data; and
updating at least one calibration parameter of the photogrammetry system using the computed at least one updated calibration parameter
are performed for each given stereo pair of cameras of a system comprising a plurality of stereo pairs of cameras, each given pair of stereo pairs of cameras mounted on a fixed axis and characterized by calibration parameters determined at initialization.

24. A system for maintaining an accuracy of a photogrammetry system comprising a stereo pair of cameras mounted on a fixed axis and characterized by calibration parameters determined at initialization, the photogrammetry system for tracking one of a touch probe and a 3D sensor, the system comprising:

a memory for storing data; and a processor operatively connected to each camera of the stereo pair of cameras and to the memory and adapted for implementing the method as claimed in claim 1.

25. A computer-implemented method for maintaining an accuracy of a photogrammetry system comprising at least three cameras mounted on a fixed axis, the stereo pair of cameras being characterized by calibration parameters determined at initialization, the system configured for tracking one of a touch probe and a 3D sensor, the method comprising:

in use, continuously performing a compensation loop by:

detecting, using the stereo pair of cameras, a presence of a reduced number of 3D target points compared to a corresponding number of 3D target points required for calibrating the photogrammetry system, the reduced number of 3D target points comprising at least one pair of 3D target points selected in a group comprising at least two 3D target points;

measuring image position data and a measured distance associated with the selected at least one pair of 3D target points of the reduced number of 3D target points using the stereo pair of cameras of the photogrammetry system;

computing at least one updated calibration parameter using the measured image position data and corresponding reference distance data associated with the at least one pair of 3D target points of the reduced number of 3D target points corresponding to the measured distance, wherein a corresponding reference distance data is known, the at least one updated calibration parameter determined based on the measured distance of the reduced number of 3D target points and the reference distance of the reduced number of 3D target points; and updating at least one calibration parameter of at least one camera of the stereo pair of the photogrammetry system using the computed at least one updated calibration parameter.

26. A method for measuring an object using a photogrammetry system, the method comprising:

providing a photogrammetry system comprising a stereo pair of cameras mounted on a fixed axis, the stereo pair of cameras being characterized by calibration parameters determined at initialization, the system configured for tracking one of a touch probe and a 3D sensor;

in use, continuously performing a compensation loop by:

detecting, using the stereo pair of cameras, a presence of a reduced number of 3D target points compared to a corresponding number of 3D target points required for calibrating the photogrammetry system, the reduced number of 3D target points comprising at least one pair of 3D target points selected in a group comprising at least two 3D target points;

measuring image position data and a measured distance associated with the selected at least one pair of 3D target points of the reduced number of 3D target points using the stereo pair of cameras of the photogrammetry system;

computing at least one updated calibration parameter using the measured image position data and corresponding reference distance data associated with the at least one pair of 3D target points of the reduced number of 3D target points corresponding to the measured distance, wherein a corresponding reference distance data is known, the at least one updated calibration parameter determined based on the measured distance of the reduced number of 3D target points and the reference distance of the reduced number of 3D target points; and updating at least one calibration parameter of at least one camera of the stereo pair of the photogrammetry system using the computed at least one updated calibration parameter;

upon detection of a given event, measuring the object using the photogrammetry system with the at least one calibration parameter updated.

27. The method as claimed in claim 26, wherein the measuring of the data associated with the at least one pair of 3D target points is performed using a corresponding pair of frames acquired by the stereo pair of cameras, further wherein the measuring of the object using the photogrammetry system is performed using the corresponding pair of frames acquired by the stereo pair.

* * * * *